(12) United States Patent
Cisler et al.

(10) Patent No.: US 9,836,472 B2
(45) Date of Patent: Dec. 5, 2017

(54) TAGGED MANAGEMENT OF STORED ITEMS

(71) Applicant: Apple Inc., Cupertino, CA (US)

(72) Inventors: Pavel Cisler, Lost Gatos, CA (US); Yan Arrouye, Mountain View, CA (US); Laurent Baumann, Campbell, CA (US); Loic Vandereyken, Palo Alto, CA (US); John Hornkvist, Cupertino, CA (US); Ali Ozer, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 353 days.

(21) Appl. No.: 13/909,965

(22) Filed: Jun. 4, 2013

(65) Prior Publication Data

US 2014/0359505 A1    Dec. 4, 2014

(51) Int. Cl.
*G06F 3/048* (2013.01)
*G06F 17/30* (2006.01)

(52) U.S. Cl.
CPC .. *G06F 17/30126* (2013.01); *G06F 17/30103* (2013.01)

(58) Field of Classification Search
CPC ..................... G06F 17/30126; G06F 17/30716
USPC ....................................................... 715/707
See application file for complete search history.

(56) References Cited

U.S. PATENT DOCUMENTS

| | | | |
|---|---|---|---|
| 5,898,434 A | 4/1999 | Small et al. | |
| 7,437,358 B2 | 10/2008 | Arrouye et al. | |
| 7,617,225 B2 | 11/2009 | Arrouye et al. | |
| 7,873,916 B1 | 1/2011 | Chaudhri | |
| 8,024,335 B2 | 9/2011 | Anthony et al. | |
| 8,031,170 B2 * | 10/2011 | Brown et al. | 345/156 |
| 8,667,418 B2 * | 3/2014 | Chaudhri | G06F 3/0482 715/790 |
| 8,805,785 B2 * | 8/2014 | Vasudevan et al. | 707/638 |
| 8,856,161 B2 * | 10/2014 | Balakrishnan et al. | 707/758 |
| 2006/0179037 A1 | 8/2006 | Turner et al. | |
| 2006/0242164 A1 * | 10/2006 | Evans et al. | 707/100 |
| 2007/0174247 A1 * | 7/2007 | Xu et al. | 707/3 |
| 2008/0189336 A1 * | 8/2008 | Prihodko | 707/104.1 |
| 2008/0256488 A1 * | 10/2008 | Van De Sluis | G06F 17/30274 715/810 |

(Continued)

OTHER PUBLICATIONS

Cory Bohon, Mac_Labels, Feb. 4, 2011.*

(Continued)

*Primary Examiner* — Matthew Ell
*Assistant Examiner* — Mohamed Abou El Seoud
(74) *Attorney, Agent, or Firm* — Ronald S. Fernando

(57) ABSTRACT

In one embodiment, non-transitory computer-readable medium stores instructions for implementing tagged management of stored items, wherein an embodiment can receive an input indicating the selection of a graphical representation of a file in the GUI of an operating system, and can also receive an input indicating the intent to attach a tag to the file. The system can perform an automatic search through the metadata of files associated with the user and the user account to find the set of files having the tag, responsive to the request to display the set of files. Having located the set of files, an operation can be performed to display the set of files having the requested tag, regardless of the storage location of the files.

33 Claims, 28 Drawing Sheets

(56) References Cited

U.S. PATENT DOCUMENTS

2009/0106674 A1* 4/2009 Bray ................ G06F 17/30112
                                                    715/762
2009/0113281 A1* 4/2009 Close et al. ................. 715/205
2009/0119304 A1   5/2009 Preslan et al.
2010/0332536 A1  12/2010 Ramaswamy et al.

OTHER PUBLICATIONS

Steven Snell, Thunderbird_Addons, Dec. 12, 2011.*
Cory Bohon, Mac Labels, Feb. 4, 2011.*
ICloud Design Guide, Sep. 19, 2012, 55 pages, Apple Inc., Cupertino, CA.

* cited by examiner

TAGGED MANAGEMENT OF STORED ITEMS

BACKGROUND OF THE DISCLOSURE

Computing devices often include a file system that stores information items in various directories or subdirectories (e.g., folders) in a file system hierarchy. Particularly, a modern data processing system, such as general-purpose computer system, allows a user of such system to create a variety of different types of data files. For example, a typical user of a data processing system can create text files with a word processing program such as Microsoft Word; can create an image file with an image-processing program such as Adobe's Photoshop; or can create slide shows and presentations using Keynote, by Apple Inc.

In a hierarchical file system, each information item (e.g., a file or a folder) can be given a respective file name. An information item's file name and its file path in the file system hierarchy can be used to uniquely identify the item in the file system. Modern computing devices also provide graphical user interfaces (GUIs) or "views" to help the user navigate and manipulate the file system hierarchy and the items stored therein. However, the large number of the different types of files that can be created or modified can present a challenge to a user who is seeking to find a particular file. U.S. Pat. Nos. 5,898,434 and 7,617,225 and 7,437,358 describe examples of finding documents.

Recent developments in mobile device file systems and GUIs have given rise to application based storage systems, where applications on a mobile device have a data container where user oriented files are stored. Using this approach, a user can easily organize and access data associated with an application. In some instances, applications can also store data on a network accessible distributed storage system, so the user can access such data on any network capable device that can access the distributed storage system.

SUMMARY OF THE DESCRIPTION

An embodiment can receive an input indicating the selection of a graphical representation of a file in the GUI of an operating system (OS) that is executing on a data processing system, and can also receive an input indicating the intent to attach a tag to the file. The input can be, for example, a hotkey, a menu touch or "click", or a gesture on a touch screen or touch pad device. The input can cause the data processing system to annotate the file by adding the tag (e.g. a word or set of words) to metadata associated with the file. The word or set of words may already exist in the metadata or content of the file or it may not already exist in that metadata or content. The system can perform an automatic search through metadata of files associated with the user and the user account to find the set of files having the tag, responsive to a request to display the set of files. Having located the set of files, which can be located in any number of different places throughout one or more data storage devices, including a distributed storage system upon which the user has an account, an operation can be performed to display the set of files having the requested tag. In one embodiment, the files are displayed in a window of the GUI having multiple views. In one embodiment, a tag can be created or attached to a file contemporaneously with the file's creation by adding a tag to the file in the save dialog box of an application.

Moreover, annotating a file with a tag can include additional elements such as associating a chromatic representation of the tag with the file, the chromatic representation of the tag including at least one color. Once a set of files having a tag are displayed, additional files can be tagged by dragging and dropping files without the tag into the window displaying the set of files with the tag. In one embodiment, a set of files having the tag can be displayed in a tag view even if all of the files in the set are not located in the same folder on the mass storage device of the data processing system. In one embodiment, the set of files can include files that are located on a cloud-based, distributed storage system upon which the user has an account. At least some of the tags on a file can be preserved when the file is electronically transmitted to the distributed storage system, or to a different data processing system, or to a different user.

In one embodiment, a file having a tag can be electronically transmitted between users, and the electronic transmission can preserve one or more tags associated with the file. In one embodiment, a user can direct the system to remove all tags attached to a file before transmitting the file. In one embodiment, a file having one or more tags which have been added to the file by a second user are visible to, but not active on a data processing system of a first user, and an aspect of the GUI indicates that the tag is visible, but not active on any file on the data processing system of the first user. In one embodiment, the tag received by the first user from the second user is used as an autocomplete option in a tag user interface for the first user, and the system can receive an input to add the tag to the set of tags that are active for the first user thereby making the tag from the second user active.

In one embodiment, an action can be associated with a tag, such that the action (e.g., printing) is automatically performed on the file when the tag is applied, tags can also be temporary, such that, for example, a tag that is associated with an action is removed from the file when the action is complete. In one embodiment, a tag can be mutually exclusive with a different tag.

The above summary does not include an exhaustive list of all aspects of the various embodiments. It is contemplated that the invention includes all systems and methods that can be practiced from all suitable combinations of the various aspects summarized above, and also those disclosed in the Detailed Description below.

BRIEF DESCRIPTION OF THE DRAWINGS

The following description includes discussion of figures having illustrations of example implementations of the various embodiments. Accordingly, the figures should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein each describe various embodiments and implementations of the invention, and do not necessarily all refer to the same embodiment, though embodiments are not necessarily mutually exclusive. In the accompanying figures, like references indicate similar elements.

DETAILED DESCRIPTION

Figure 1:
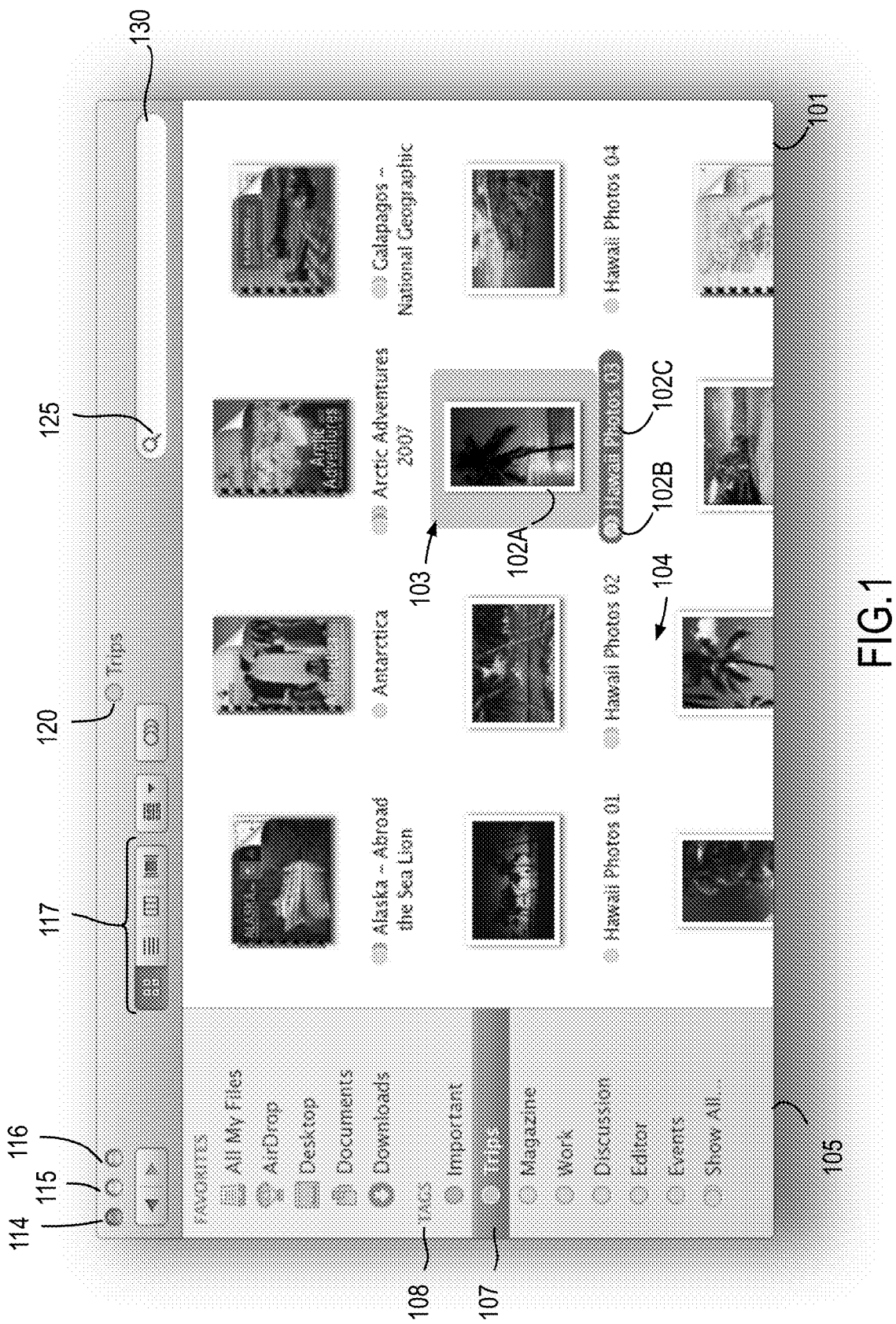
FIG. 1 is an illustration of a Graphical User Interface (GUI) that displays files associated with a subset of tags available on a data processing system, according to an embodiment.

Various embodiments of tagged management of stored items are described herein. Numerous specific details are described to provide a thorough understanding of various embodiments. However, in certain instances, well-known or conventional details are not described in order to provide a concise discussion of embodiments of the various embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2013.

The tagged management of stored items allows a user to associate files stored locally on a data processing system with other files stored on the data processing system, as well as files stored on a cloud based distributed storage system, such as the iCloud storage system, from Apple Computer, Inc. of Cupertino Calif. For example, if the user has files, documents, or other data on a local machine that is related to files, documents, or other data that is stored on a distributed storage system, the user can apply a "tag" to each of the related files. A tag is a data key (such as one or more words) that can be associated with, and describes the file's origin, use, purpose, project, intended audience, or some other user or system defined descriptor. The user can apply a tag to a group of related files that are stored in various storage locations (e.g. different Folders) on a data processing system, and then retrieve or manipulate those files as though they were stored in a common storage location. In one embodiment, a user can store different files in different folders on a local storage device of the data processing system and also store files in a remote (cloud based) storage system that the user can access and the user to annotate all the these files with a common tag and then use that common tag to retrieve and display a list of all the files in a view in a GUI. The user's system can receive files from other users who have applied tags to those files, and those applied tags can be different than any tag on the user's system and the tags from other users can be filtered to precut them from appearing to be active (e.g. they are not displayed in a side bar). In one embodiment, a tag can also be associated with an optional chromatic indicator including at least one color, to provide an enhanced visual indication that a file has a tag, and which tag is associated with the file. Once a file has a tag, the file can be displayed in conjunction with other files having the same tag, regardless of the file type or file location on the data processing system, or in one embodiment, the cloud based distributed storage system.

An embodiment can also allow a set of temporary tags that exist for a limited time, or for a limited purpose, or that have a limited lifetime of association for files. For example one tag, such as a "search results" tag can be automatically applied to files that are displayed within a search results window. An additional tag "print pending" can be applied to a group of files that are currently being printed, and the tag can be removed from each file as the file is printed. Additionally, a tag can be associated with a specific operating system action, such that once the tag is applied to a file, a pre-determined set of commands or operations are performed on a file. For example, applying the print pending tag mentioned above to a file can cause the tagged file to print to a default printer, or can trigger a dialog from which a user can select a printer. In one embodiment, files associated with a tag can be selected, and a user can select a command that performs a common action (e.g. print or view or move or delete) on all of the files within the selected group. In one embodiment, a first tag can be mutually exclusive with a second tag. For example, the automatic application of a "printed" tag can cause the removal of a "print pending" tag.

Embodiments of the tag user interface described herein can provide an autocomplete function for previously created tags, to prevent tag duplication due to partial misspelling of a tag name. A user can create a new tag by using a name, such as one or more words, that is not already in existence, as a tag on the user's system, and the user interface can provide visual indication that a new tag is being created. The next time a user begins to type the name of the new tag, the autocomplete feature will offer the user the option to use the new tag name. The user can also associate a color to visually indicate the tag in the user interface. Once a group of files have a tag, the user can associate this group of files into a tagged group and this association can be used to quickly display all files with the tag, or perform a common action on all of the files in the group (e.g. print each file or view each file in a viewer window or move each file to a new or existing folder, etc.).

Tagged Files User Interface

Various different examples of user interfaces for searching for files having a common tag, displaying files having a common tag, associating new files with a set of files having a common tag, and attaching a new tag to one or more files are provided herein. It will be understood that some features from certain embodiments can be mixed with other embodiments such that hybrid embodiments can result from these combinations. It will be appreciated that certain features can be removed from each of these embodiments and still provide adequate functionality in many instances.

FIG. 1 is an illustration of a Graphical User Interface (GUI) that displays files associated with a subset of tags available on a data processing system, according to an embodiment. The exemplary window 101 is GUI window through which a user can search for files having one or more tags, display files having at least a particular tag, add new files to the set of files having a tag, or add one or more new tags to a set of files. Window 101 can, for example, be a Finder window in the Mac OSX operating system from Apple Inc. of Cupertino, Calif., or window 101 can be a window provided by a file management system on other operating systems. The window 101 includes a file display region 104 which can be used to display representations of files in the set of files having at least a particular tag. An indicator for each file 102A can be associated with a representation of at least some of the color-coded tags associated with the particular file 102B, and a file name 102C of the file, such as file "Hawaii Photos 03."

A search icon 125 is located within a text entry region 130, to indicate that text can be entered into the region to perform a search using the entered text. When text is entered into the text entry region, a search using the entered text can be automatically performed, and updated for each character entered. The window further includes conventional display items such as a title bar 120, which can be used to configure the window and view control buttons 117 and maximize, minimize, and resize buttons 114, 115, and 116. The title bar 120 indicates that the current display is a tag View, which displays files having a particular tag, such as the "Trips" tag. A user can use a pointing device, such as a mouse, a touchpad, or a touchscreen, to select the name of tag, such as the Trips tag, by positioning a cursor or touch element over the tag name and touching or clicking the tag name using a pointing device, which can cause the display of a highlight 107 around the name of the selected tag under the tags header 108 of the sidebar portion 105 of window 101. Further discussion of embodiments of side bar portions is provided in U.S. Pat. No. 7,437,358, which is incorporated herein by reference. This selection will cause the file display region 104 to display a set of files that have been tagged with the selected tag. Alternatively, a new and separate window can appear, which shows only the items that have been tagged with a particular tag (e.g., the selected tag).

The view control buttons 117 can be used to change the manner in which the files are displayed in the file display region 104. The file display region 104 of the exemplary display is in "icon view" mode, which causes the file indicator 102A to be an iconic file indictor, such a thumbnail preview if the file is an image file. The view control buttons 117 also indicate the current view mode of the window file display region 104 of the window 101 by highlighting, or otherwise differentiating the selected view mode from the unselected view modes. Display views other than icon view are possible, including a list view, column view, and cover flow view. In each view mode, a user can select one or more files in the file display region 104, which can cause a highlight 103 to appear around the selected file. A selected file can be opened in an application, moved to another location, deleted, duplicated, or have other actions performed on it, all from the view show in file display region 104.

A pre-populated and a user-configurable side bar portion 105 can contain various icons, including a link to a set of Favorites locations, a list of Shared items visible over a data network, a list of devices visible to the data processing system, as well as a list of tags under the tags header 108, where a user can select a tag to view files having at least the selected tag in the file display region 104. The tags displayed can be the most recently created tags, a set of tags marked as favorite tags, or the most commonly used tags. In one embodiment, the list of tags under the tags header 108 can be further configured or re-ordered by a user, and the user can dynamically add or remove tags listed under the tag header 108 using, for example, a drag and drop gesture or some other means of indicating intent to add or remove a tag to or from the list of tags under the tag header 108 in the side bar portion 105 of the window 101.

The number of tags displayed in side bar portion 105 can be limited to a specific number of tags, and a "Show All . . . " command can be included under the tags header 108 to allow a use to request a display of all of the user's tags on the user's system. In one embodiment, the number of tags displayed under the tag header 108 can be determined by the GUI, or some other element of an operating system (OS) of the data processing system, and can optionally be configured by the user. In one embodiment, the limit changes dynamically with the dimensions of the window 101, or the font size used to display text elements in the GUI.

Although the exemplary embodiment illustrated omits explicit scrolling elements, in one embodiment the window 101 can include conventional scrolling controls such as controls to allow a user to scroll through a list of files or icons in the file display region 104, or in the side bar portion 105, by selecting and dragging the scroll elements with a pointing device, or by using a scrolling gesture on a touch screen, or by other user interface techniques known in the art.

Figure 2:
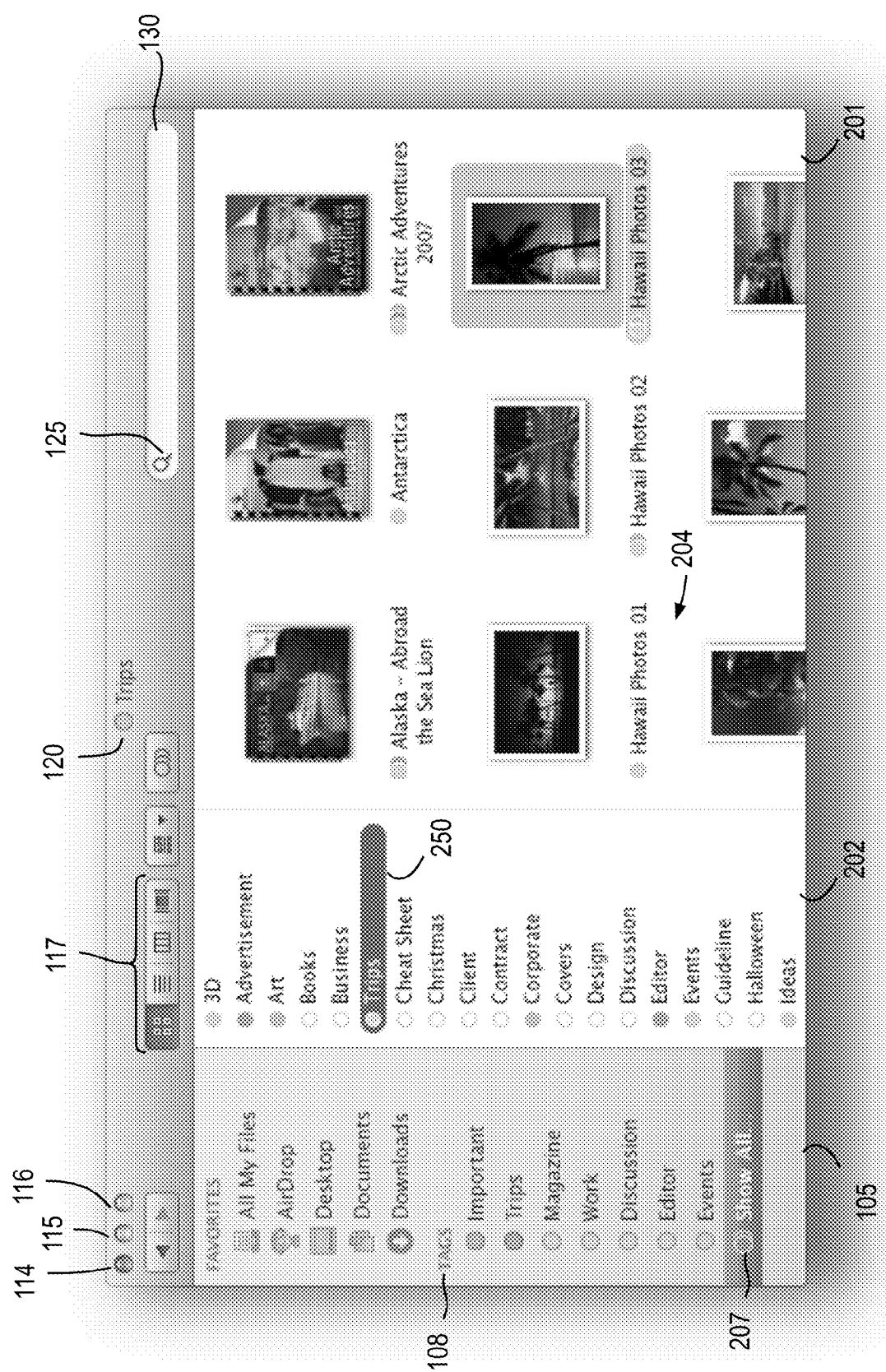
FIG. 2 is an illustration of a GUI that displays files associated with all available tags on a data processing system, according to an embodiment.

FIG. 2 is an illustration of a GUI that displays files associated with all available tags on a data processing system, according to an embodiment. An exemplary window 201 contains elements common to several GUI windows, such as the search icon 125 that is located within the text entry region 130, conventional display items such as the title bar 120 and view control buttons 117, as well as and maximize, minimize, and resize buttons 114, 115, and 116. Additionally, sidebar portion 105 is present, and displays elements such as a favorites list, a shares list, a devices list, and list of tags under the tags header 108. A user can select a "Show All . . . " entry in the tags list, which can cause a highlight 207 to appear around the entry, and can cause additional "all tags" display region 202 to be displayed, which lists all available tags on a system, including tags that are not otherwise displayed under the tags header 108 in the sidebar portion 105. If a tag has an associated color code, the color code associated with the tag is also displayed. When the GUI causes the all tags display region 202 to appear, the file display region 104 as illustrated in FIG. 1 can be visually reduced in size to file display region 204. Once the list of tags is displayed in the all tags display region 202, a user can select a tag from the list of tags shown in the all tags display region 202, which can cause a highlight indictor 250 to appear around the selected tag, and the cause the set of files displayed in the file display region 204 to shift to files having the selected tag.

Figure 3A:
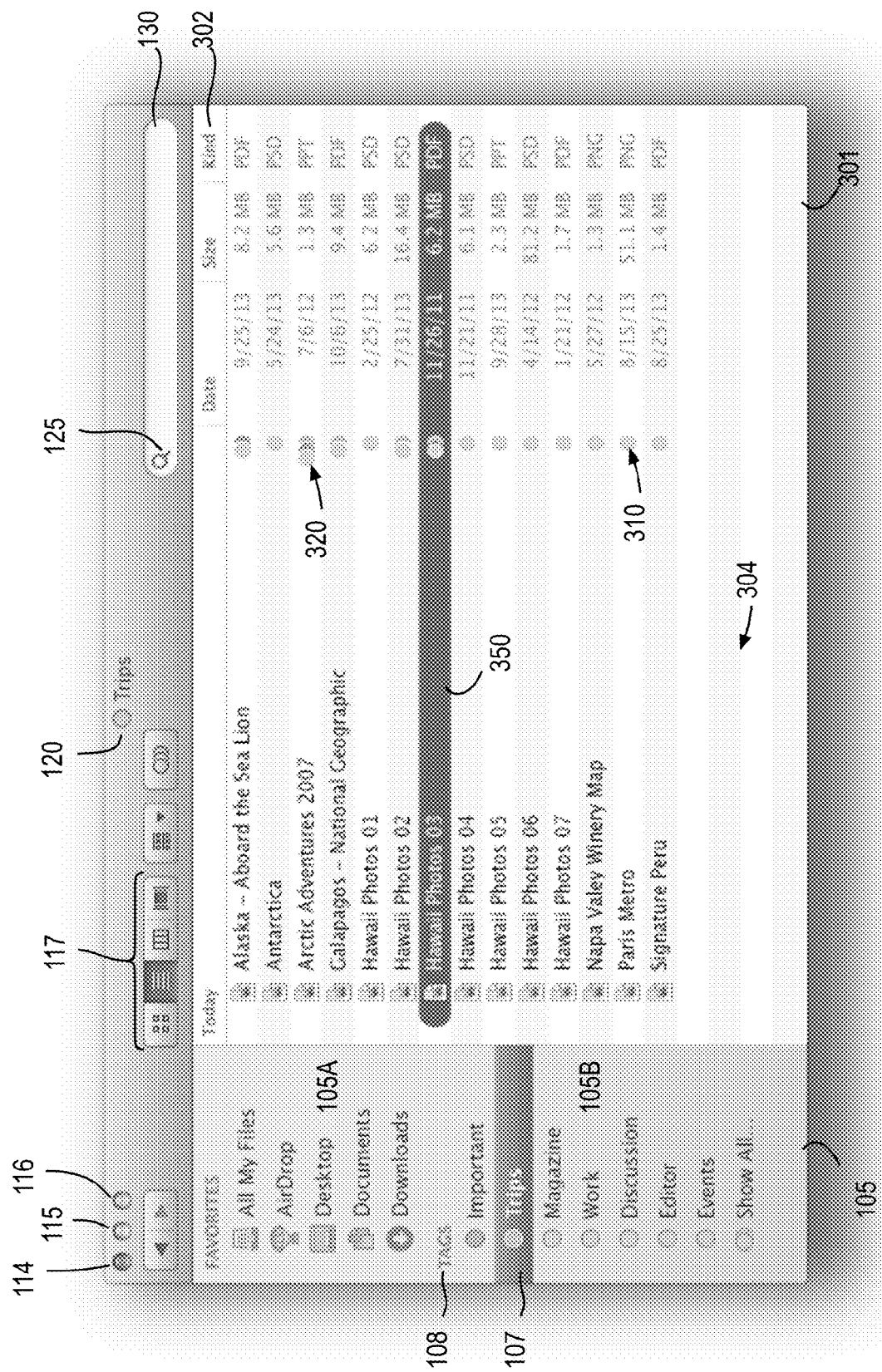
FIGS. 3A, 3B, and 3C are illustrations of an embodiment of a GUI that provides an additional means for displaying files associated with a subset of tags on a data processing system, which displays the files in a list view.
Figure 3B:
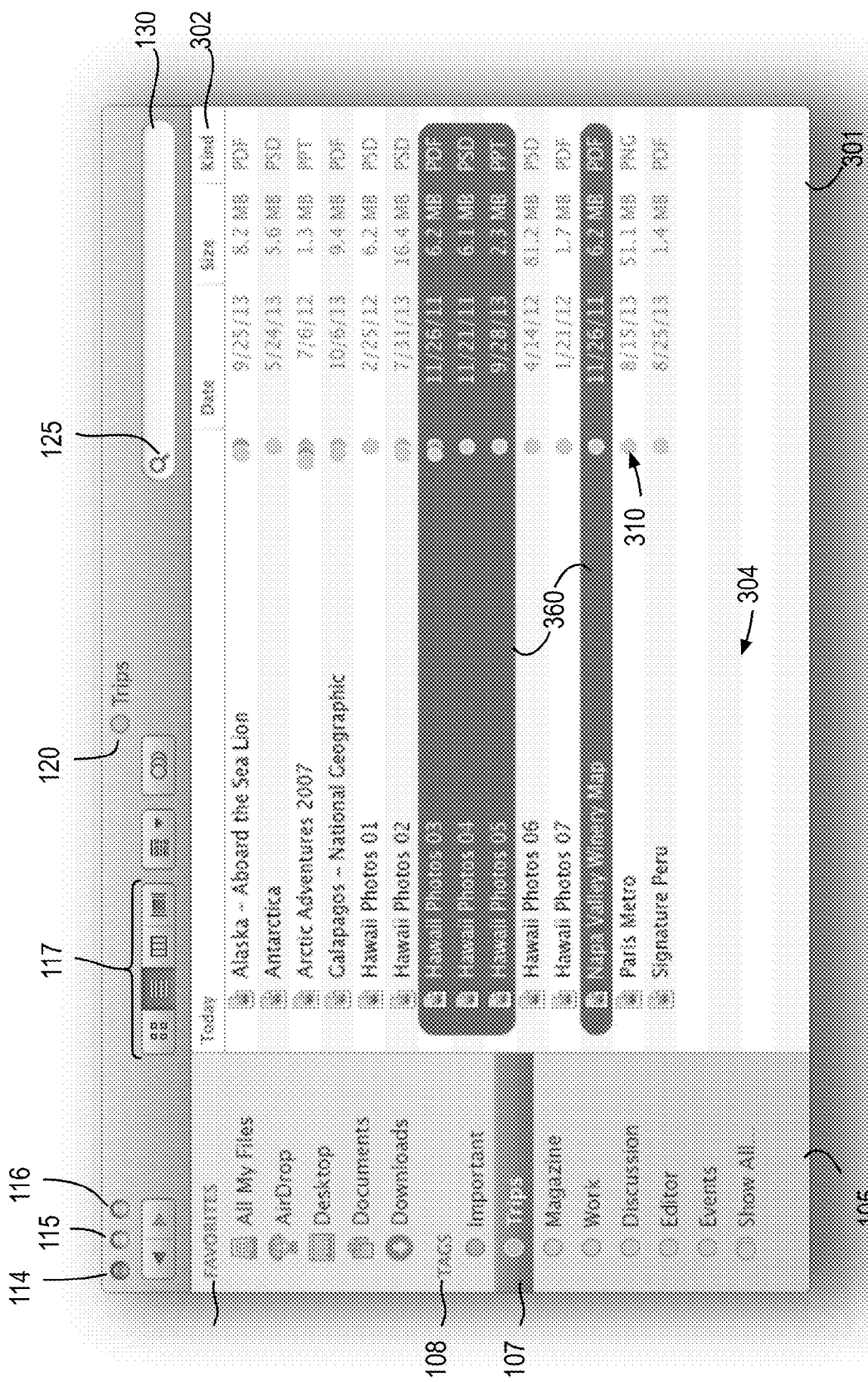
Figure 3C:
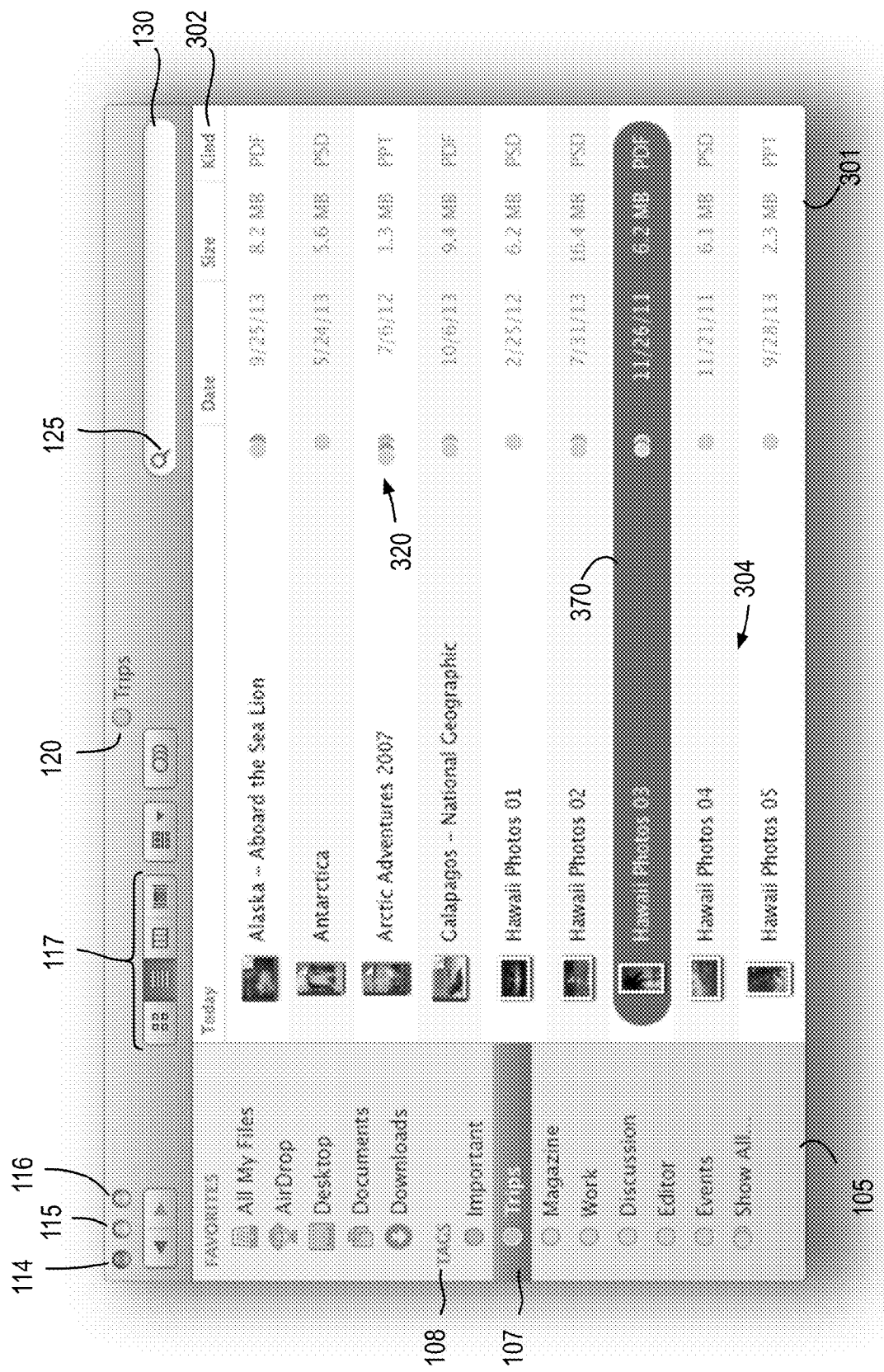

FIGS. 3A, 3B, and 3C are illustrations of an embodiment of a GUI that provides an additional means for displaying files associated with a subset of tags on a data processing system, which displays the files in a list view. In one embodiment of the GUI, a user can select the exemplary window 301, and then use the view control buttons 117 to change the view of the set of tagged files that is displayed in the file display region 304. In the exemplary GUI of FIG. 3A, a user has used the view control buttons 117 to cause the display to change from the icon view to a list view by selecting the indicator for the list view mode. In the list view, the window 301 maintains elements common to several GUI windows, such as the search icon 125 that is located within the text entry region 130, conventional display items such as the title bar 120, as well as and maximize, minimize, and resize buttons 114, 115, and 116. Additionally, the favorites list and tags list is displayed, and a list of tags are displayed under the tags header 108 in sidebar portion 105.

In the exemplary illustration of FIG. 3A, the Trips tag has been selected, as indicated by the highlight 107 on the Trips tag under the tags header 108. The file "Hawaii Photos 03" is selected, as indicated by the GUI highlight 350 in the file display regions 304. If a file is associated with a tag having a color code, the color code of the tag can be displayed 310 along with other information associated with the file. In one embodiment, a header bar 302 can be displayed above the file display region to provide labels for the information displayed in the various columns of the list view, including the "Kind" of the file listed (e.g., Portable Document Format (PDF), Photoshop Document (PSD), etc.), the size of the file, the date in which the file was created or last modified, and the name of the file. In one embodiment, files can be grouped or displayed based on the date in which the tag was attached to the file, and the dates can be displayed relative to the current date (e.g., today, yesterday, etc.).

In the exemplary illustration of FIG. 3B, multiple files having the Trips tag are selected, as indicated by the highlight 360 shown around the file information of the multiple selected files in the file display region 304. Once multiple files have been selected, one or more tags can be added or removed to those files. The selected files indicated by the highlight 360 can be stored in various different locations (e.gh., different folders) throughout the data processing system, and the tag system allows them to be displayed and accessed as a group based on the common tag (e.g., Trips) associated with the file.

In the exemplary illustration of FIG. 3C, multiple files having a tag are displayed in list view with an iconic file indicator for each file. As illustrated, the list view of the tag UI can be configured to display larger icons than the icons illustrated in FIG. 3A and FIG. 3B. In one embodiment, the larger icons can be thumbnail preview images if the file having the tag is a file having photographic or video data. In FIG. 3C, a single file is selected, as indicated by the highlight 370 in the file display region 304. A single file can be associated with multiple tags, and where multiple tags associated with a file have color indicators, multiple color indicators can be displayed to indicate at least some of the multiple colored tags associated with the file, as illustrated by the multiple tag color codes displayed at 320. The number of tag color codes displayed can be determined entirely by the system, or can be configurable by the user.

Figure 4:
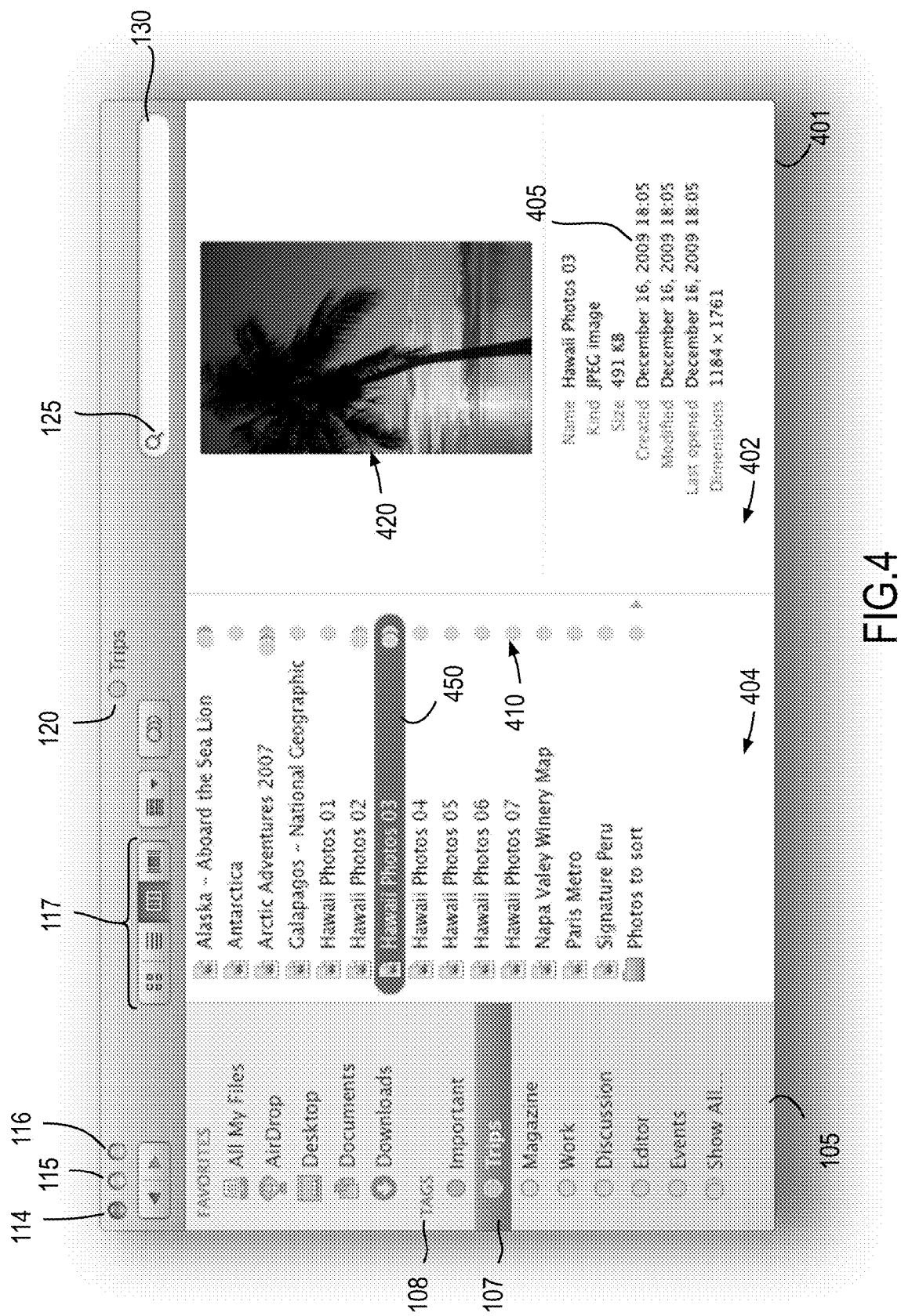
FIG. 4 is an illustration of an embodiment of a GUI that provides an additional means for displaying files associated with a subset of tags on a data processing system, which displays the files in a column view mode.

FIG. 4 is an illustration of an embodiment of a GUI that provides an additional means for displaying files associated with a subset of tags on a data processing system, which displays the files in a column view mode. In one embodiment, a user can select a view control button in the set of view control buttons 117 which cause the GUI window 401 to shift into a column view mode. In the exemplary illustration of FIG. 4, the Trips tag has been selected, as indicated by the highlight 107 on the Trips tag under the tags header 108. The file "Hawaii Photos 03" is selected, as indicated by the GUI highlight 450 in the file display regions 404. If a file is associated with a tag having a color code, the color code of the tag can be displayed 410 along with other information associated with the file.

In column mode, a preview of the selected file can be displayed in a preview column 402. A preview image 420 of the selected file can be displayed in the preview column, along with file information 405 such as the name of the file, the Kind of the file listed (e.g., Portable Document Format (PDF), Photoshop Document (PSD), etc.), the size of the file, the date in which the file was created, last modified, or last opened. In one embodiment, dimension information can be displayed for image files. An embodiment can also display a preview image of a document file, or other file types that can be accessed by software that is installed on the data processing system.

Figure 5A:
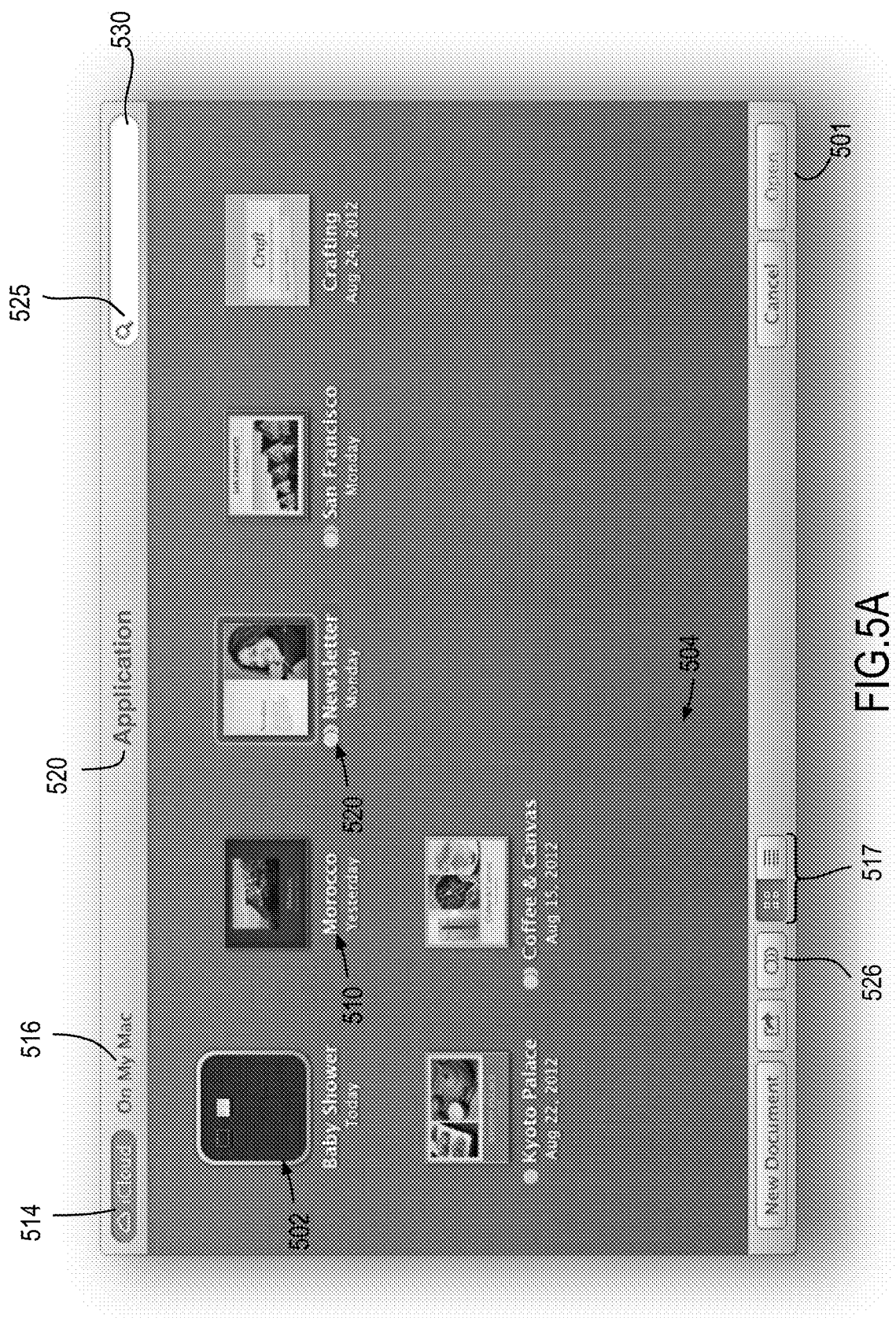
FIGS. 5A, 5B, and 5C are illustrations of an embodiment of a GUI that displays files available on a cloud based distributed storage system.
Figure 5B:
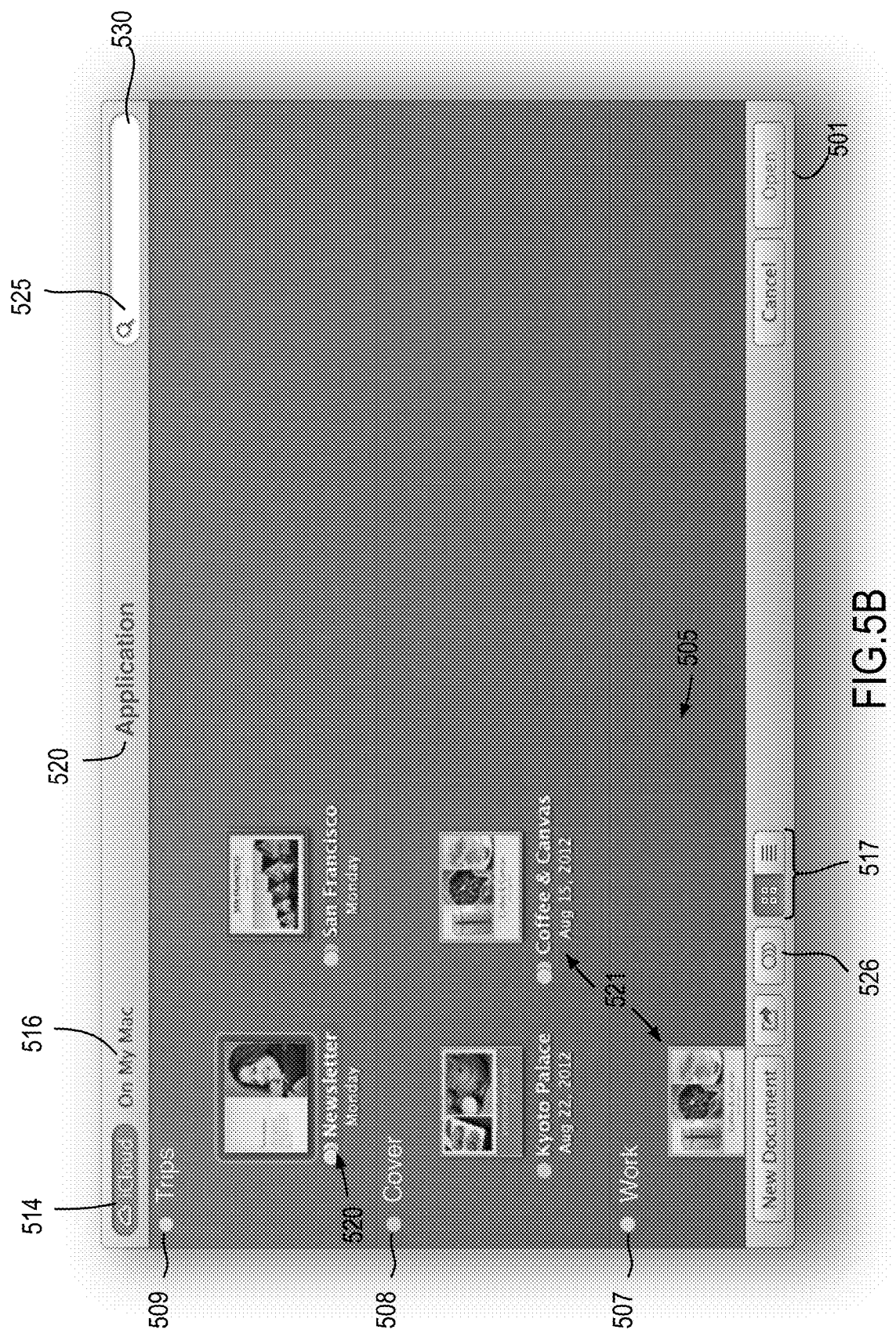
Figure 5C:
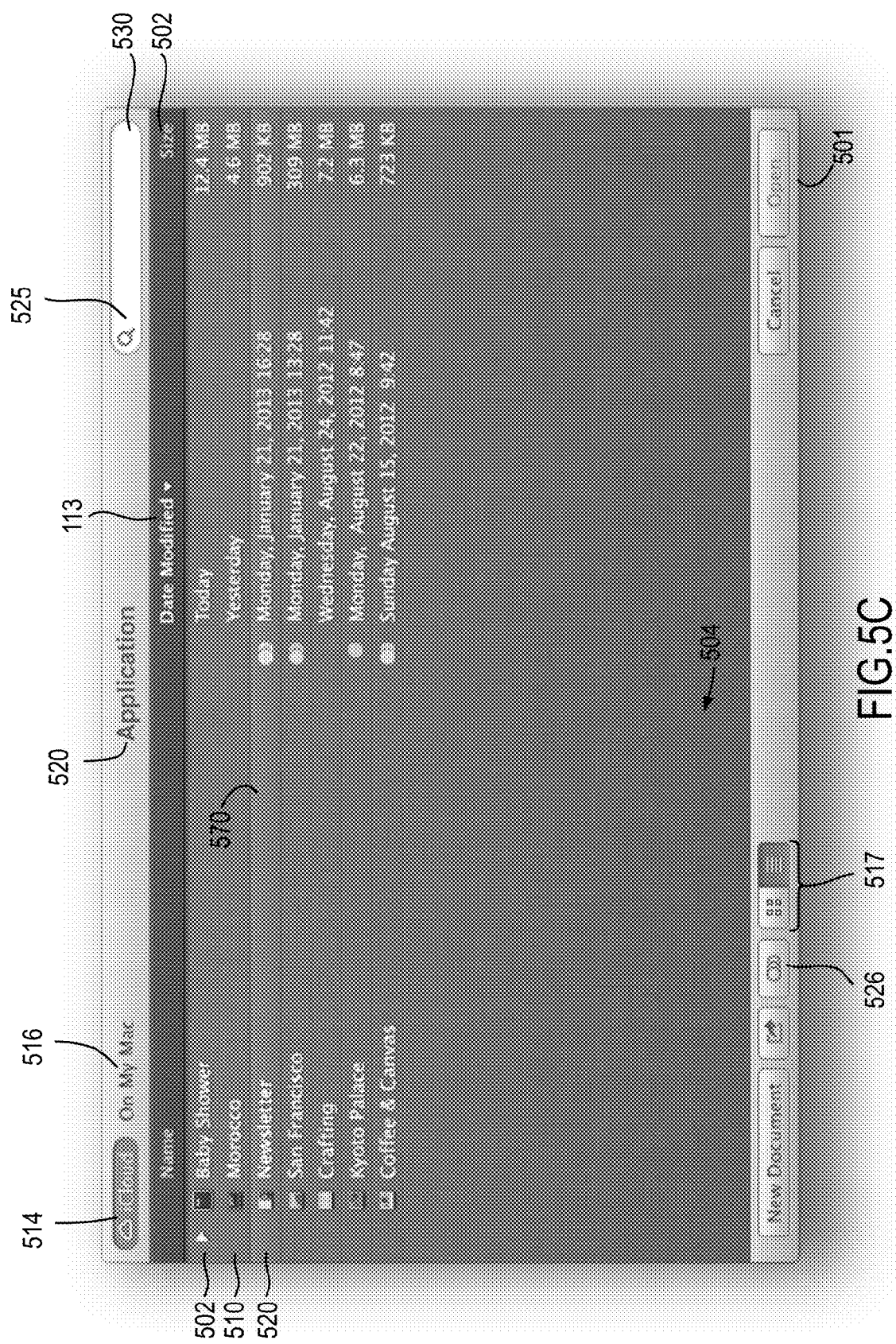

FIGS. 5A, 5B, and 5C are illustrations of an embodiment of a GUI that displays files available on a cloud based distributed storage system. In one embodiment, the cloud based distributed storage system uses application based storage, in which each application has an associated datastore in which files related to the application are stored. According to an embodiment, files related to an application using application-based storage are accessible first by executing the relevant application, and then accessing the file store of the application. In one embodiment, each application or operating system controls the locations (e.g., a "folder" or subdirectory) for its files and the user is, in a default mode of operation, prevented from controlling the location of the files of the application, although the user may be given the option of overriding this default mode of operation (e.g., as a "save as" option in which the user can change the location). The location can also, in one embodiment, be a sandboxed location such that an application is restricted, the operating system, to store its files in only designated, predetermined location in order to provide protection against malware. Tagged management of these stored items can enable files in an application based storage system to be associated with related files in a hierarchical file system.

In the exemplary illustration of FIG. 5A, a window 501 has a file display region 504 which displays files associated with an application that includes the application based storage feature. A title bar 520 displays the name of the application, and can be used to reposition the window 501 within the GUI. A search icon 525 is located with a text entry region 530, to indicate that text can be entered into the region to perform a search of the various files using the entered text. An indicator that the file display region 504 is currently displaying files stored on the cloud based distributed storage system can be present on the GUI (e.g., "iCloud" icon 514). An additional indicator (e.g., "On My Mac" 516) can also be present to allow the user to change the file display region 504 to a local view, to display files stored locally on the data processing system. An embodiment of the local view can be substantially similar to those illustrated in FIG. 1 through FIG. 4.

The file display region 504, in the exemplary illustration is in an icon view mode, which is analogous to the icon view mode depicted in FIG. 1 and FIG. 2, as demonstrated by the iconic preview images associated with the files, and the icon mode indicator of the view control buttons 517 at the lower left of the window 501, below the file display region 504. In the file display region 504, files with and without at least one tag are shown. For example, the file "Morocco" 510 is not associated with a tag, while the "Newsletter" file 520 is illustrated as being associated with at least two tags.

In one embodiment, folders or groupings (e.g., 502) of multiple files can be created and viewed within the distributed application based data store. Such groupings, in one embodiment, are limited to a specific instance of application-based storage, and may not be reflected outside of that particular storage area. To create associations between files which can be reflected in both application based storage of the cloud based distributed storage system and a local, hierarchical file system, the associated files can be assigned a common tag using the tag button 526. The tag button 526, which, in one embodiment of the GUI, is located near the view control buttons, can be used to attach or remove tags from a file, and will be described in FIG. 6A through FIG. 7D below.

In the exemplary illustration of FIG. 5B, the exemplary window 501 displays a file display region 505 which displays files sorted by tag. An embodiment can display files using display views including a list view and an icon view, as selected by the view control buttons 517, while sorting the various files by their associated tags (e.g., Newsletter 520). Files having multiple tags can appear in multiple sort groups, and can be displayed multiple times, for each tag group visible in the file display region 505 (e.g., "Coffee & Canvas" 521).

In the exemplary illustration of FIG. 5C, the exemplary window 501 displays a file display region 504 which displays files with and without at least one tag, while listing the files in a list view. In one embodiment, a user can cause the GUI to display files in the application based storage in a list view similar to the list views of FIG. 3A through FIG. 3C by selecting the list view button of the view control buttons 517. In list view, an embodiment can display only those files having at least one tag (e.g., Newsletter 520), or can display all files, including files without at least one tag (e.g., Morocco 510), as illustrated in FIG. 5C.

Attaching Tags to a File

FIGS. 6A through 6D are illustrations of an embodiment of a GUI to attach existing tags to files displayed within a GUI window. The files depicted can be stored locally on a data processing system, or can be stored on a cloud based distributed storage system, including files in the application based data store depicted in FIG. 5A through FIG. 5C.

Figure 6A:
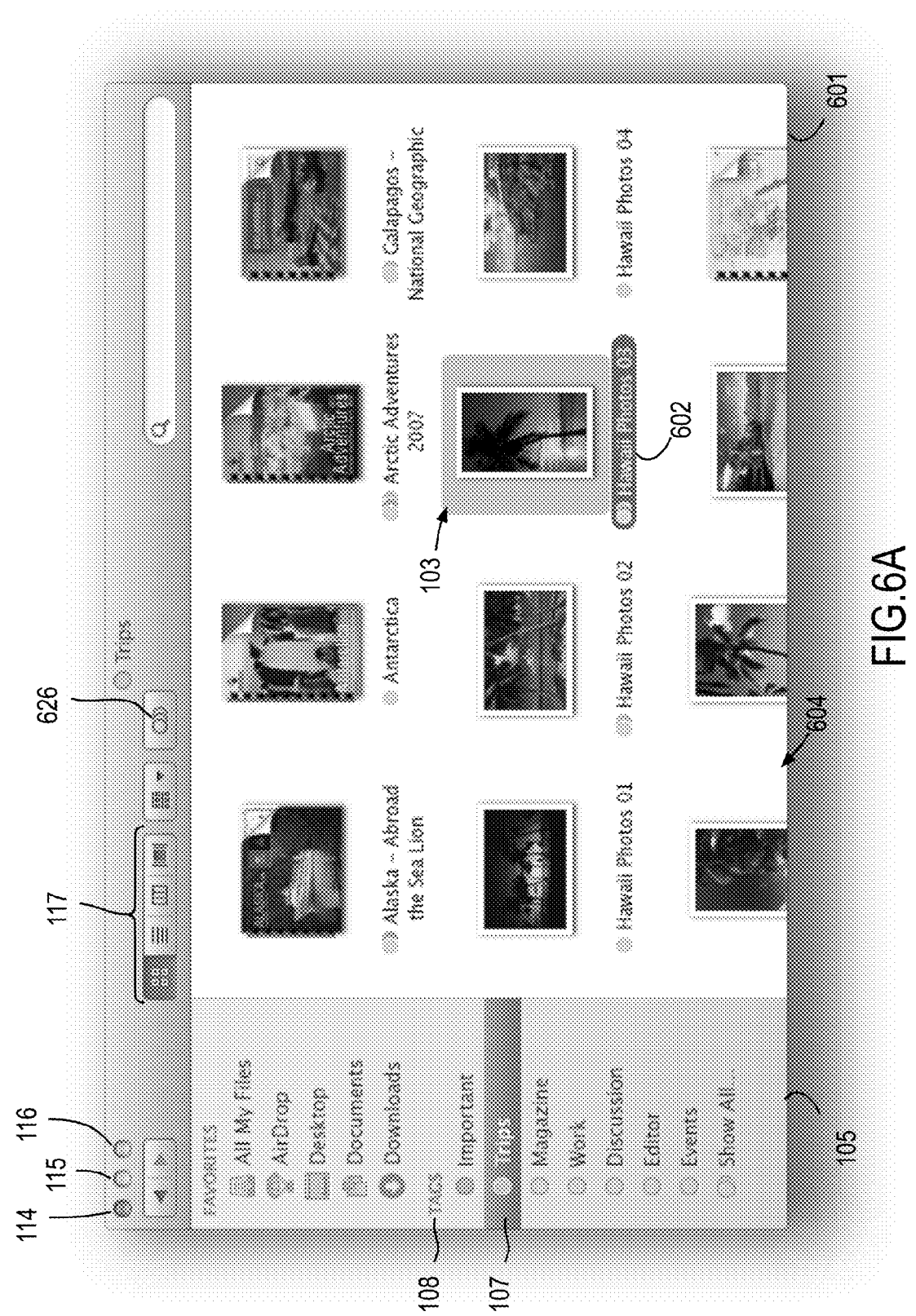
FIGS. 6A through 6D are illustrations of an embodiment of a GUI to attach existing tags to files displayed within a GUI window.

In the exemplary illustration of FIG. 6A, a user can attach a tag to a file by selecting a visual representation of the file in the GUI and providing an input to indicate the intent to attach a tag (e.g., a hotkey, a menu click, a gesture, etc.). For example, a user can select the file "Hawaii Photos 03" 602, which causes the GUI to place a highlight 103 on the file to indicate that the file has been selected. The user can then select a tag button 626, which will cause the GUI to display an interface 635 through which one or more tags can be attached to, or removed from the selected file 602. In one embodiment, a tag display box 630 can list the set, or a subset of tags attached to the selected file (e.g., Trips, Magazine)

In one embodiment, one or more files that are not associated with the tag on the files currently displayed (e.g., the Trips tag) can be quickly tagged with the currently displaying tag by performing a drag and drop gesture on one or more files from a different window into the file display region 604 while the window 601 is displaying the list of files with the selected tag (e.g. the tag in the tags list under the tags header 108 having the highlight 107). For example, while the set or subset of files having the selected tag are displayed in a window (e.g., window 601), a second GUI window displaying a different set of files that do not have the tag can be selected and dragged into the file display region 604 of the GUI window 601 and the system will attach the tag on display to the files that are dragged into the file display region 604.

Figure 6B:
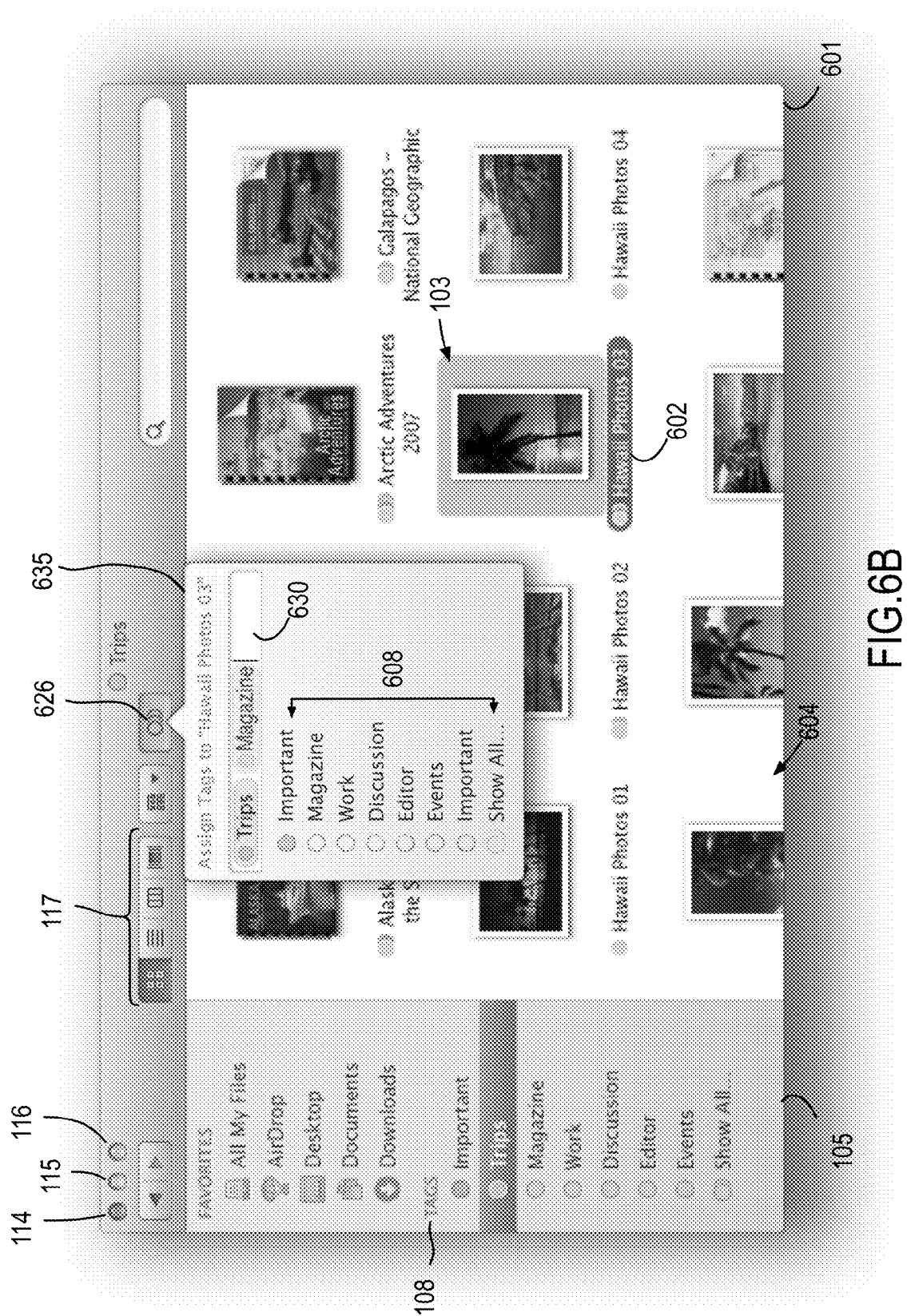

In the exemplary illustration of FIG. 6B, the tag button 626 is active, and allows a user to remove tags from, or assign additional tags to the "Hawaii Photos 03" file 602, which is currently selected, as indicated by highlight 103. In one embodiment, the use of the tag button 626 causes the tag display box 630 to display the set of the tags currently assigned to the file, or a subset thereof. For example, the Trips and Magazine and their associated color indicators are displayed for the exemplary file 602. A list of tags 608, which, in one embodiment, corresponds with the list of tags under the tags header 108 in the Side Bar portion 105, can be displayed for the user to select. Having selected one of the tags in the list of tags 608, that tag can be added to the selected file.

In one embodiment, a user can remove a tag from a file by removing the entry for the tag from the tag display box 630. In one embodiment, a user can apply multiple tags to multiple files in a single action, or can remove multiple tags from multiple files in a single action. The tag button 626 can be visible in each available view configuration, allowing a tag to be added to a file in local or application based distributed storage. Additionally, a tag can be added to a file upon creation in the save file dialog box, which can present a display substantially similar to FIG. 1 through FIG. 4 for local storage, or FIG. 5A through FIG. 5C for application-based storage on the cloud based distributed storage network.

Figure 6C:
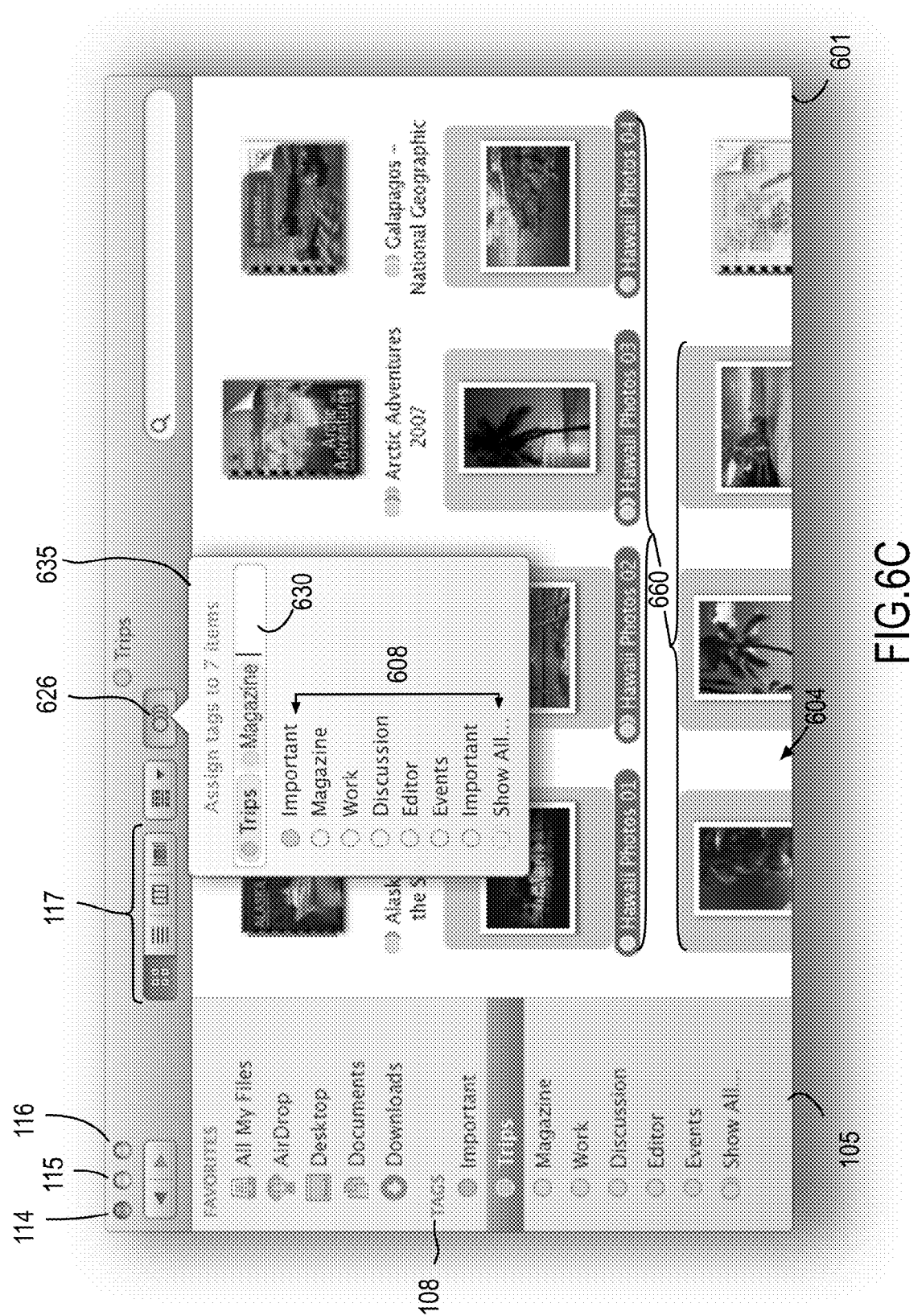

In the exemplary illustration of FIG. 6C, the tag button 626 is active, and seven files have been selected. A user, having selected a file with existing tags (e.g., Trips, Magazine) can expand the selection to include additional files. For example, a user can select a file having two tags (e.g., the "Hawaii Photos 03" file 602 of FIG. 6B, having the Trips and Magazine tag) and expand the selection to include additional files having the Trips tag 660. The user can then apply the Magazine tag to each of the selected files.

Figure 6D:
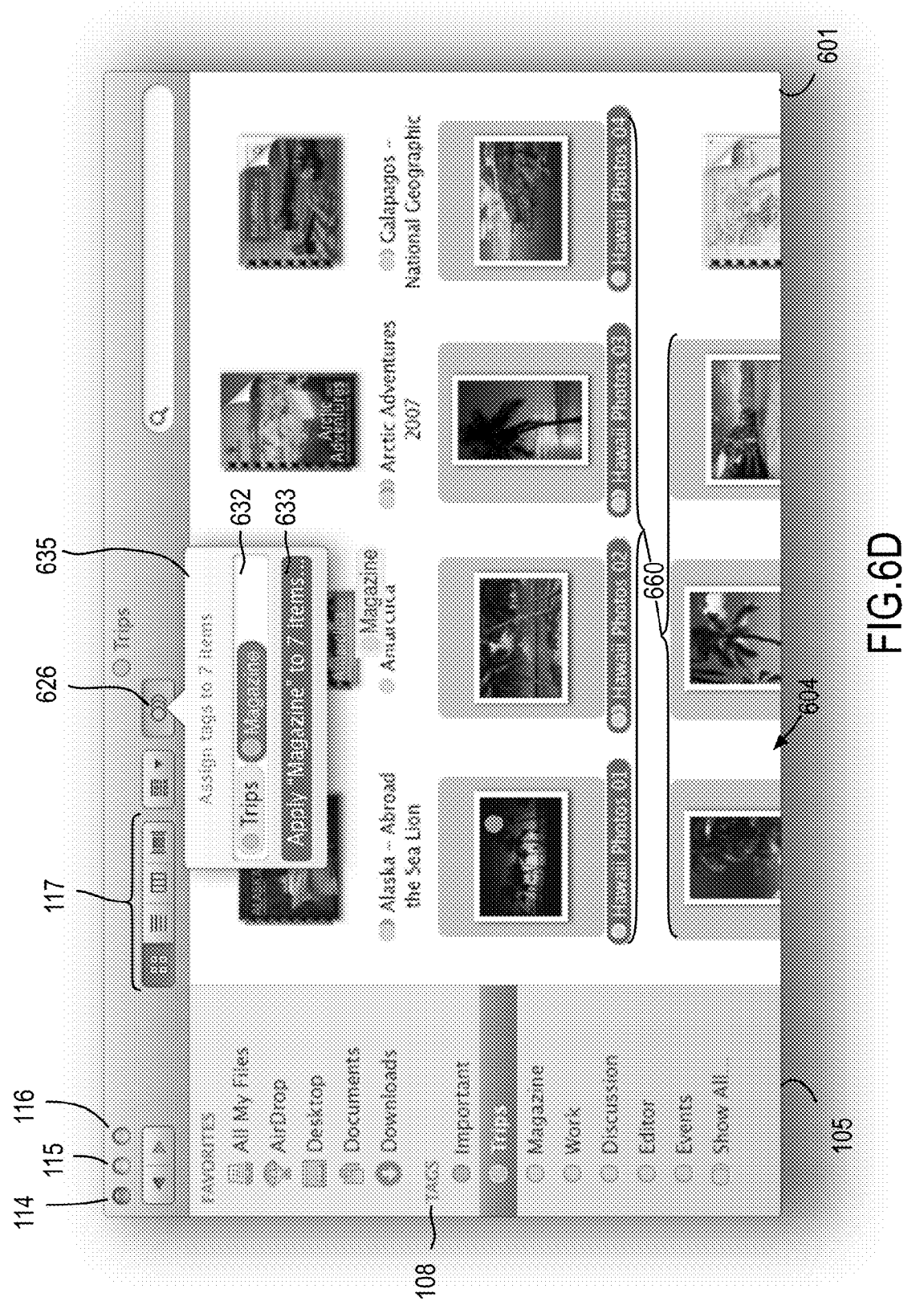

In the exemplary illustration of FIG. 6D, a confirmation dialog is shown before applying a previously existing tag to each of the selected files, according to an embodiment. A user, having selected an existing tag to apply to multiple selected files file can be presented with a confirmation dialog, to allow the user to assess whether the selected tag or set of tags will be applied to the set of selected files. In one embodiment, the confirmation dialog is presented when applying a tag to multiple files. In one embodiment, the conformation is applied each time a tag is to be applied. As illustrated, the tag display box 632 graphically indicates that the Magazine tag will be applied to additional files. In one embodiment, a confirmation dialogue 633 can be displayed, to ask the user to confirm that the tag is to be applied to the selected items. A user can confirm the tag application by, for example, pressing the Enter or Return key, or by touching, clicking or double clicking the confirmation dialogue.

It will be noted that the display and use of the exemplary tag button 626 as described in FIG. 6A through FIG. 6D is substantially similar to the display and use of the tag button 526 of FIG. 5A through FIG. 5C.

Removing Tags and Creating New Tags

FIGS. 7A through 7D are illustrations of an embodiment of a GUI to create a new tag and attach the new tag to files displayed within a GUI window. In one embodiment, instead of selecting an existing tag, a user can type the name of a new tag into the tag display box 630 after clicking, or otherwise activating the tag interface 635 via the tag button 626. If a user does not wish to apply one of the tags listed in the tag list 608 displayed on the tag interface 635, the user can type the name of a tag into the tag display box 630. As the user types, a set of autocomplete options can be presented to the user, to show existing tags available to the user, including tags that are not displayed in the tag list 608.

Figure 7A:
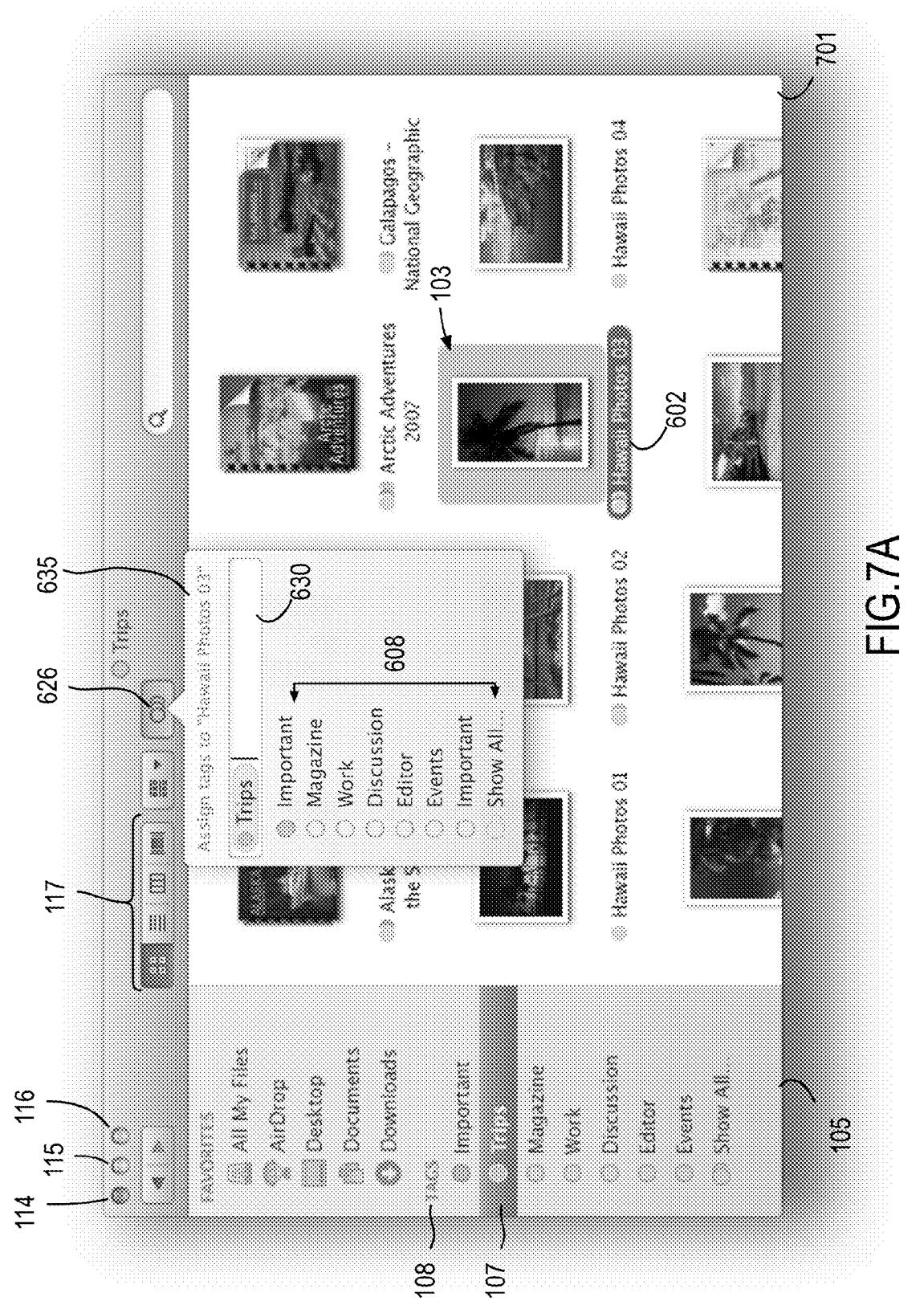
FIGS. 7A through 7D are illustrations of an embodiment of a GUI to create a new tag and attach the new tag to files displayed within a GUI window.

In the exemplary illustration of FIG. 7A, a user is in the process of removing the Magazine tag from the Hawaii Photos 03 file 602, and replacing the removed tag with a new tag. In one embodiment, the user can transition to the state depicted in FIG. 7A from the state depicted in FIG. 6B by selecting the tag display box 630 using the "delete" key to remove the Magazine tag from the file 602. Returning to FIG. 7A, the user can then type the name of a tag to apply to the file in place of the Magazine tag.

Figure 7B:
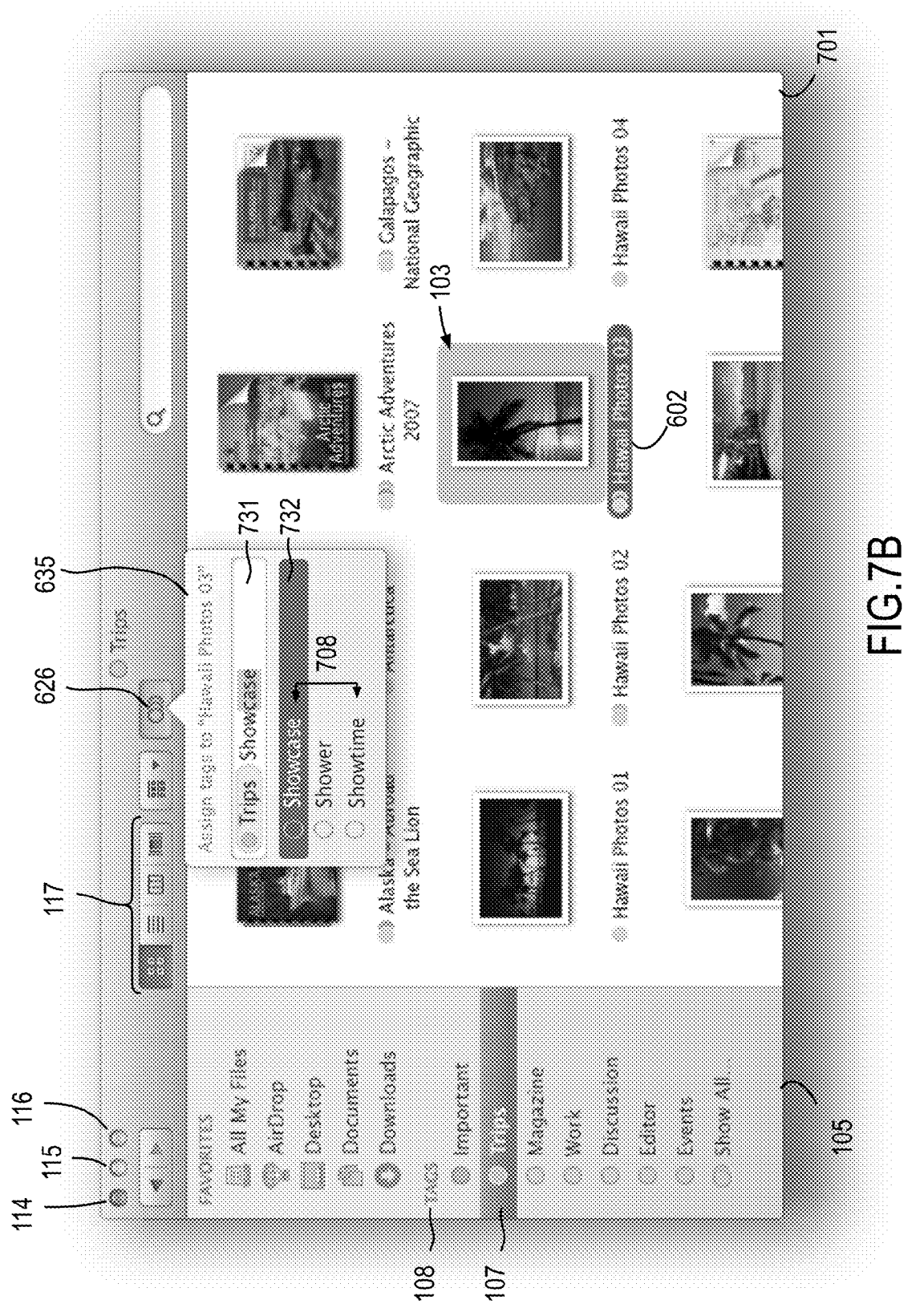

In the exemplary illustration of FIG. 7B, a user is in the process of typing a new tag for the Hawaii Photos 03 file 602 in the tag display box 731 of the tag interface 635. As the user types into the tag display box 731, a set of autocomplete suggestions 708 are displayed, which lists a set of existing tags that correspond to the characters that the user has entered. In one embodiment, the autocomplete suggestions 708 can include tags which are not yet active on the data processing system in current use, but are tags that are associated with files that the user has received via electronic transmission (e.g. e-mail, Apple Filing Protocol (AFP), etc.). Additionally, tags that are applied to files associated with the user on a distributed network storage system, but not yet active on the current data processing system, can also be listed amongst the autocomplete suggestions. In one embodiment, the tag interface 635 can automatically highlight 732 the topmost entry of the autocomplete suggestions 708, allowing the user to easily accept the highlighted autocomplete option 732. A user can also select a specific autocomplete entry to use instead of the topmost suggestion.

Figure 7C:
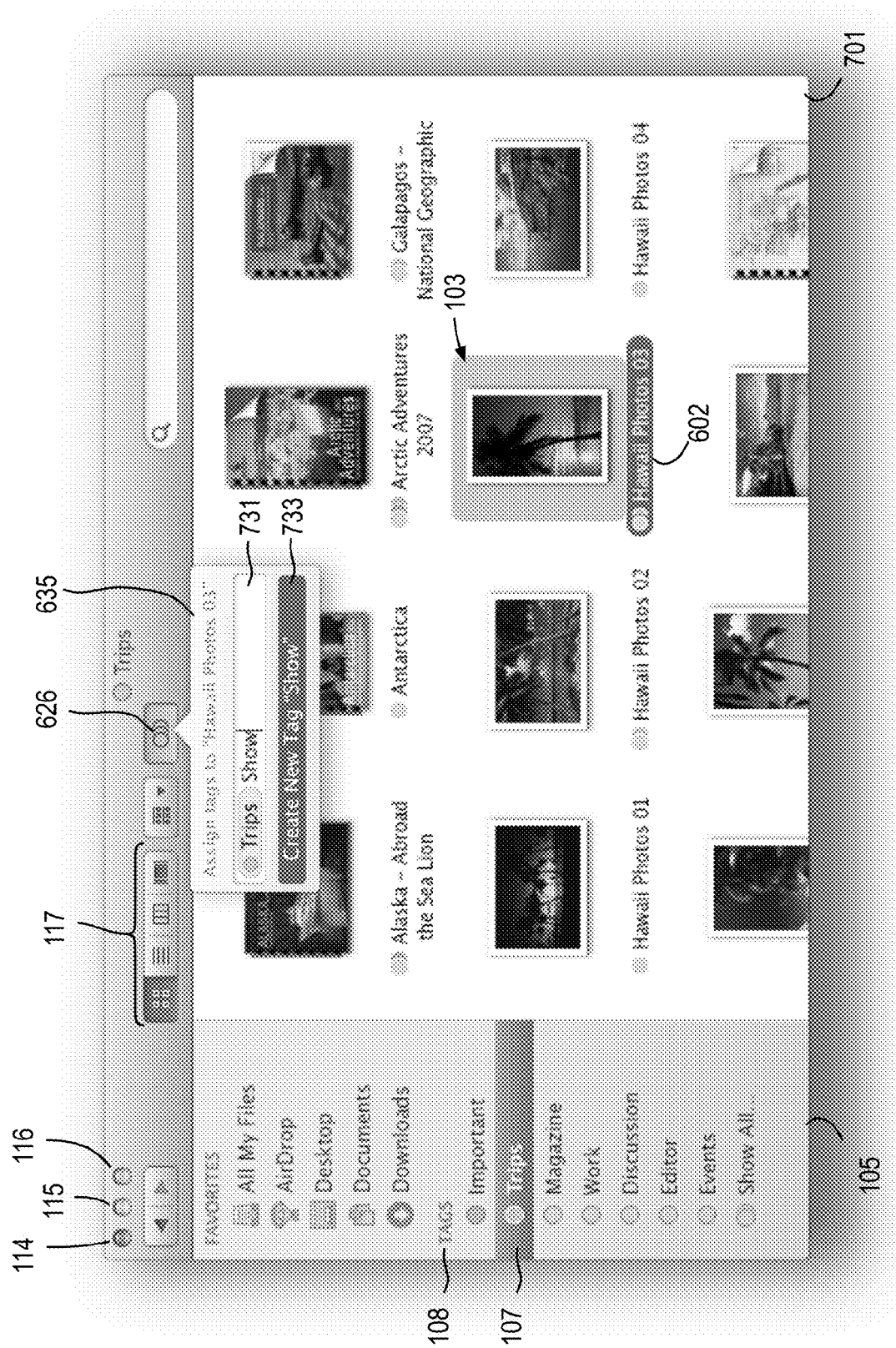

In the exemplary illustration of FIG. 7C, a user has rejected the autocomplete suggestions and has opted to create a new tag. In one embodiment, the tag display 731 will display both the existing tag currently applied to the file (e.g., Trips), as well as the name of the new tag, which can be created by the user. A confirmation dialog 733 can be presented to the user, to allow the user to confirm the creation of a new tag before the new tag is created.

Figure 7D:
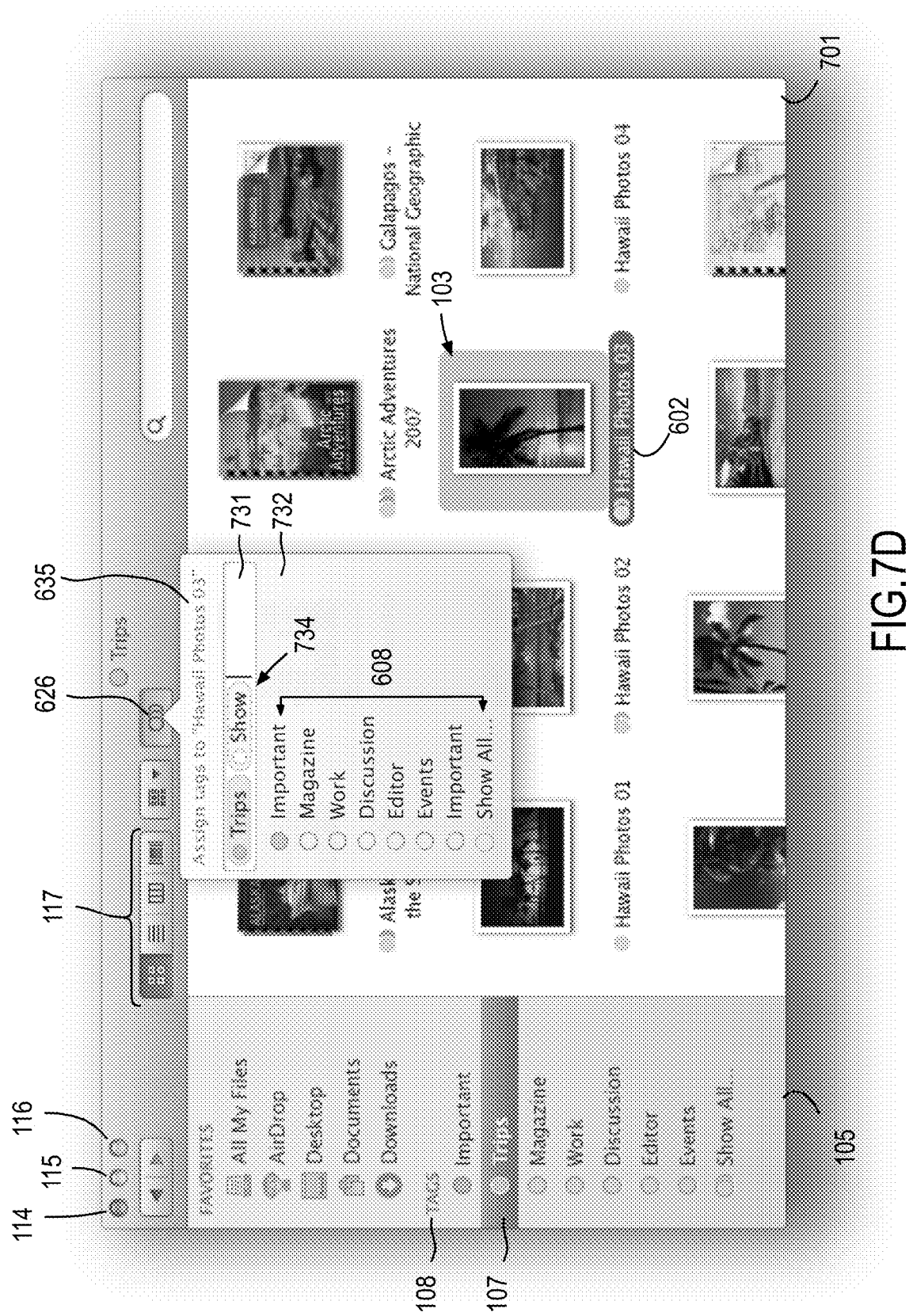

In the exemplary illustration of FIG. 7D, a user has accepted the confirmation dialog 733 of FIG. 4C, and a new tag 734 has been created, which can be applied to the file 602 in place of the Magazine tag, which can be removed. In one embodiment, an additional dialog can be presented to the user when the user attempts to add the new tag 734 to the file 602, similar to confirmation dialog 633 of FIG. 6D, to confirm that the user wishes to add the new tag 734 to the file. In one embodiment, an additional dialog (not shown) can be presented to the user to confirm the removal of the Magazine tag. In one embodiment, the new tag 734 is created immediately when the user accepts the confirmation dialog 733, which confirms that the user wishes to create the new tag 734, or the new tag can be provisionally created, but not fully created, or otherwise activated on the data processing system, until the tag is added to at least one file. In one embodiment, after the user creates a new tag, the new tag is added to the list of tags under the tag header 108 of the side bar portion 105.

Tag Context Menu

Figure 8A:
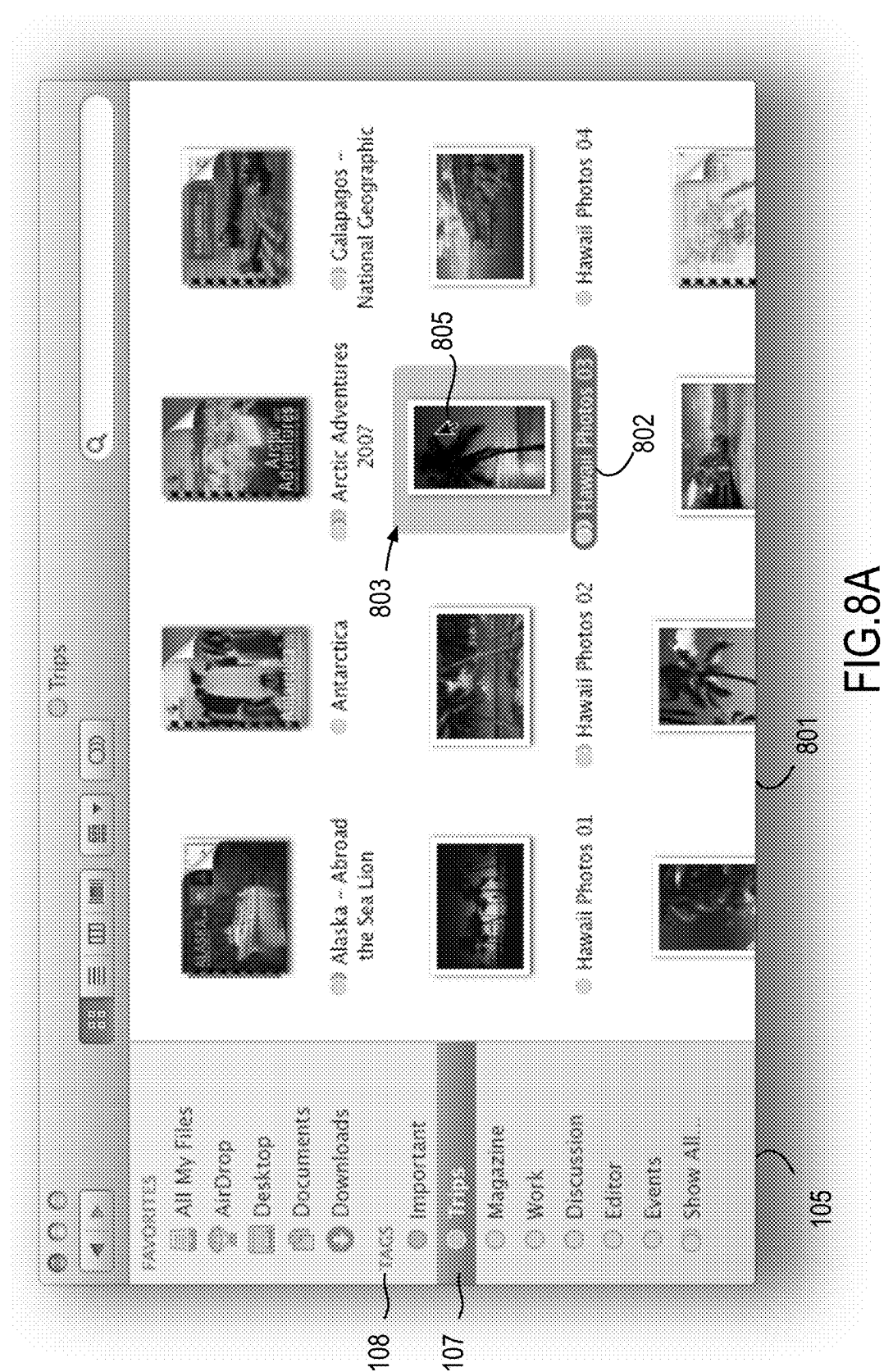
FIGS. 8A through 8C are illustrations of an embodiment of a GUI to add or remove existing tags to one or more files using context sensitive menus provided by the GUI.
Figure 8B:
Figure 8C:

FIGS. 8A through 8C are illustrations of an embodiment of a GUI to add or remove existing tags to one or more files using context sensitive menus provided by the GUI. In one embodiment, previously created tags can be added to or removed from one or more files using a context sensitive menu made available by the GUI.

In the exemplary illustration of FIG. 8A, a window 801 displays files having the Trips tag, as indicated by the highlight 107 on the Trips tag on in the tags header 108 in the sidebar portion 105. A user can then use a context menu to add or remove tags from one or more selected files currently on display. Multiple GUI methods can be employed to make use of the context menus, such as a two-finger touch gesture, a double tap gesture, or a click action with a pointing device. For example, a user can select a file 802 using, in one embodiment, a cursor 805, to cause the GUI to highlight 803 the file.

In the exemplary illustration of FIG. 8B, the window 801 displays a view similar to that of FIG. 8A, where the display of context menu 825 has been triggered. A user can then, for example, control a pointing device to move the cursor 805 to the tags 808 portion of the context menu 825. The context menu tags list (CMTL) 808 can, in one embodiment, mirror, or substantially correspond with the list of tags displayed under the tags header 108 of the Side Bar 105. In one embodiment, the set of tag listed in the context menu 825 is independently configured by the user, or independently selected by the operating system. If the set of tags 808 listed in the CMTL 808 includes a tag that exists on the selected file 802, then the tag may be removed by clicking the icon or indicator of the tag in the CMTL 808. For example, the selected file 802 has the Magazine tag, which is present in the CMTL 808. In one embodiment, the cursor 805 can be used to remove the Magazine tag by positioning the cursor 805 over the icon or indicator for the Magazine tag. The context menu can display text is a context sensitive text region 806 to indicate that selecting the indicator under the cursor 805 will remove the selected tag (e.g., Remove tag "Magazine"). In one embodiment, a "Get Info" 815 item is available, which can display various information about the attributes associated with the selected file, including the list of tags associated with the file, and can also be used to remove one or more tags from a file In the exemplary illustration of FIG. 8C, the window 801 displays a view similar to that of FIG. 8A, where the display of context menu 825 has been triggered. As illustrated, a user can, for example, control a pointing device to move the cursor 805 to the tags 808 portion of the context menu 825 and add an existing tag from the set of existing tags to the selected file 802. In one embodiment, the cursor 805 can be used to add an existing tag to the selected file 802 by positioning the cursor 805 over the icon or indicator for an existing tag, which is not currently associated with the selected file (e.g., the Cover tag). The context menu can display text is a context sensitive text region 806 to indicate that selecting the indicator under the cursor 805 will add the selected tag (e.g., Add tag "Cover"). In one embodiment, the get info 815 item displayed on the context menu can also allow a user to add additional tags to a file.

Exemplary Tag Management Processes

Figure 9:
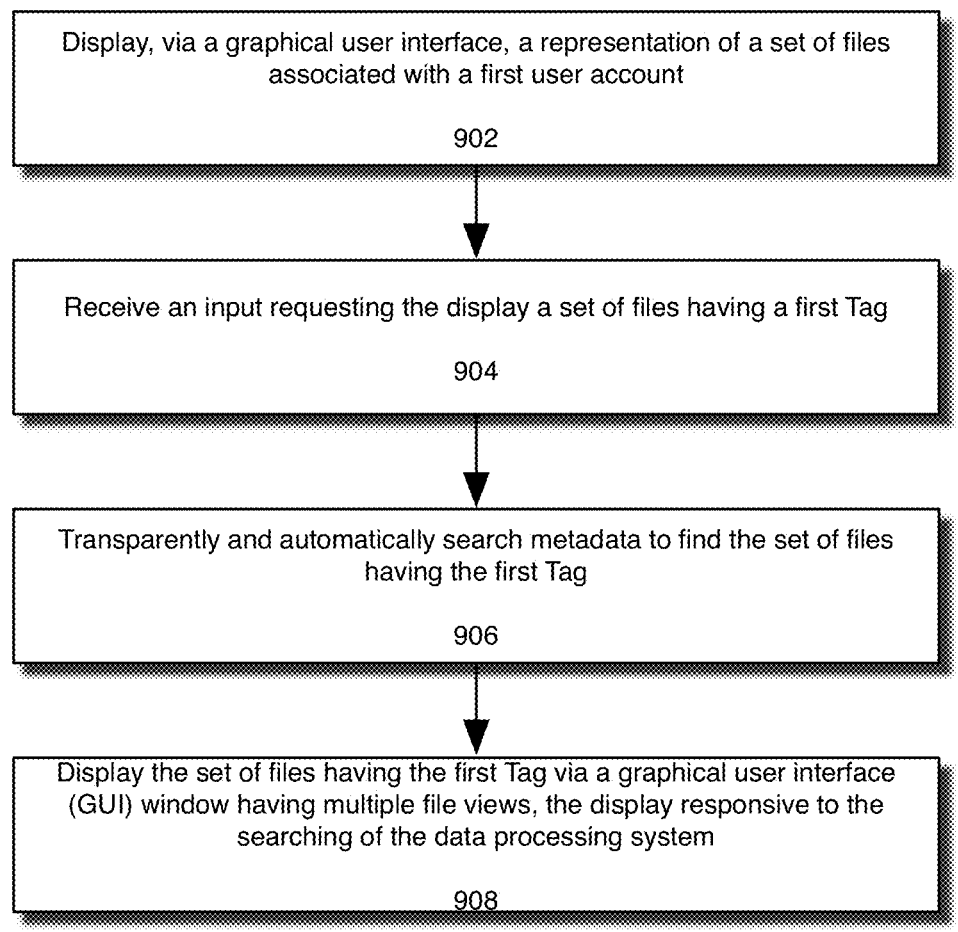
FIG. 9 is a flow diagram of the display of tagged files in a GUI window, according to an embodiment.
Figure 10:
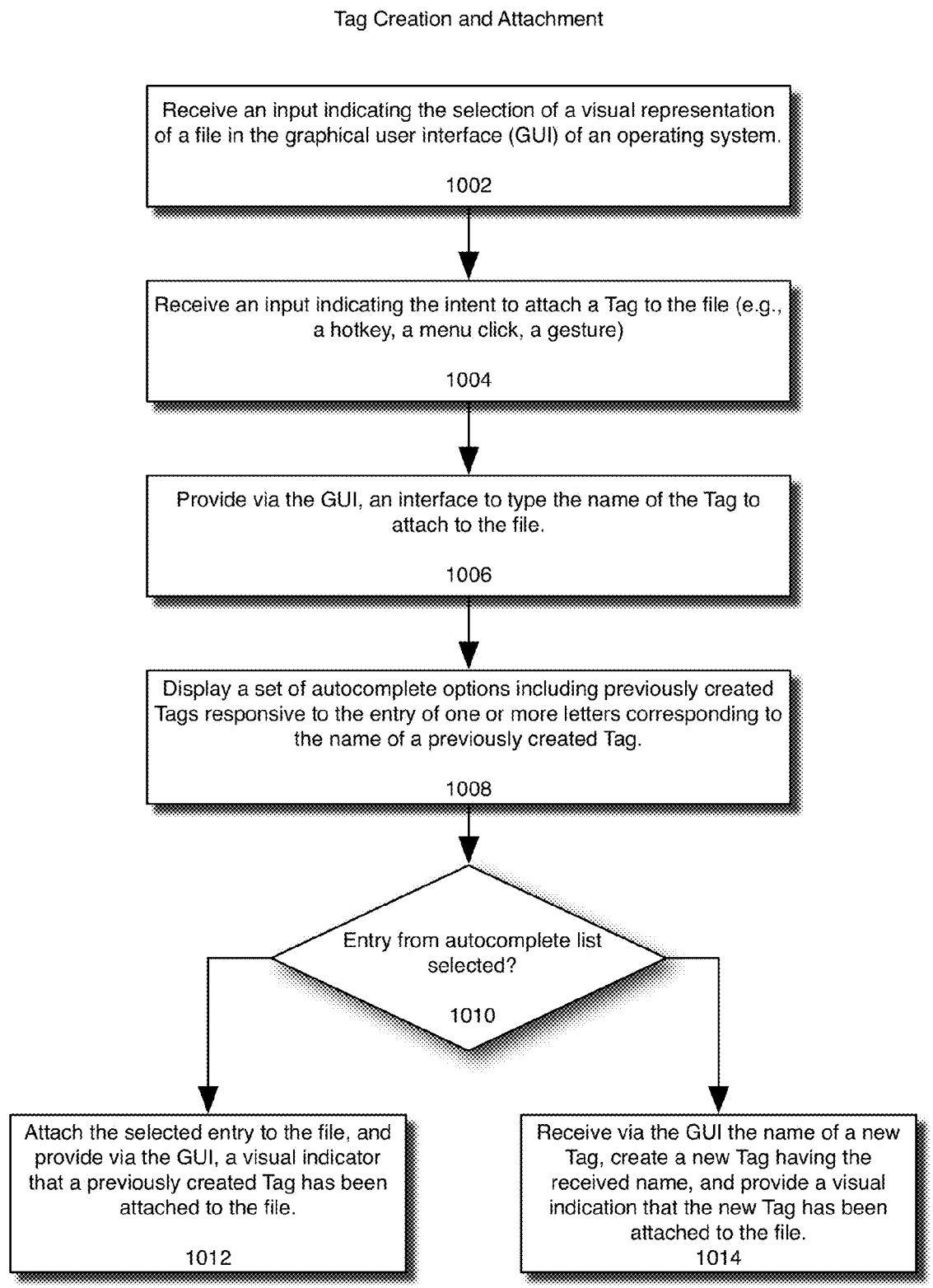
FIG. 10 is a flow diagram of tag creation and attachment, according to an embodiment.
Figure 11:
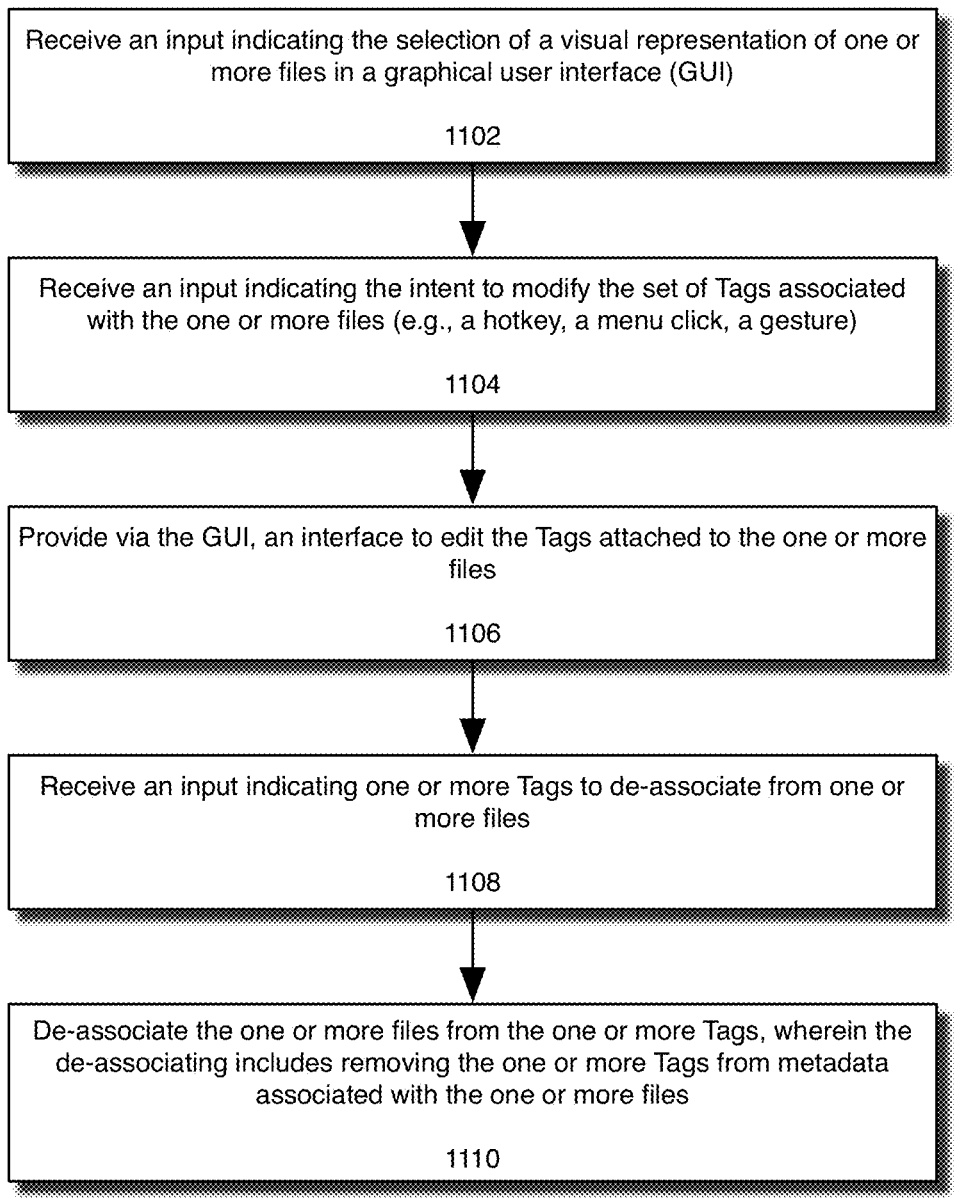
FIG. 11 is a flow diagram of tag Removal, according to an embodiment.

FIG. 9 through FIG. 11 describe exemplary process flow of a data processing system when performing an embodiment of the tagged management of stored items, tagged management of stored items allows a user to associate files stored locally on a data processing system with other files stored on the data processing system, as well as files stored on a cloud based distributed storage system. The user can apply a tag to a group of related files that are stored in various storage locations on a data processing system, and then retrieve or manipulate those files as though they were stored in a common storage location.

The processes depicted can be performed by processing logic comprising hardware (e.g. circuitry, dedicated logic, etc.), software (as instructions on a non-transitory machine-readable storage medium), or a combination of both hardware and software, including special purpose hardware, or general-purpose processors executing software logic, to perform the various embodiments. Although some of the processes are described below in terms of sequential operations, some of the operations described can be performed in a different order. Moreover, some operations can be performed in parallel rather than sequentially.

FIG. 9 is a flow diagram of the display of tagged files in a GUI window, according to an embodiment. In operation 902, the system displays, via a graphical user interface, a representation of a set of files associated with a first user account. In operation 904, the system can receive an input from, for example, a user, script or process automation, an input requesting the display of a set or subset of files associated with the first user account that have a first tag, 904. In one embodiment, the set of files can be located entirely on a data processing system that is local to the user. In one embodiment, files having the first tag can be co-located, or exclusively located on a cloud based distributed storage system, or can be located in an application based data store. In operation 906, the system can perform an automatic search through metadata of files associated with the user and the user account to find the set of files having the first tag, responsive to the request to display the set of files. Having located the set of files, which can be located in any number of different places throughout one or more data storage devices, including a distributed storage system upon which the user has an account, an operation 908 can be performed, which displays the set of files having the requested tag. In one embodiment, the files are displayed in a window of the GUI having multiple views, including views similar to the icon, list, and column views described in FIG. 1 through FIG. 4.

FIG. 10 is a flow diagram of tag creation and attachment, according to an embodiment. An embodiment can receive an input 1002 indicating the selection of a visual representation of a file in the GUI of an operating system (OS). An embodiment can also receive an input 1004 indicating the intent to attach a tag to the file. The input can be, for example, a hotkey, a menu touch or clock, or a gesture on a touch screen or touch pad device. The operating system can receive the input 1004 indicating the intent to attach a tag to a file before receiving the input 1002 indicating the selection of the visual representation of the file, or can receive an input 1002 indicating the selection of the file before receiving the input 1004 indicating the intent to attach a tag to the file. In one embodiment, multiple files can be selected before attaching one or more tags to the multiple files. In one embodiment, multiple tags can be attached to a single file.

After the selection of one or more files, and the indication of the intent to attach a tag to the one or more files, the OS can provide 1006, via the GUI, an interface in which a user can type the name of at least one tag to attach to the file. When the name of a tag is typed into the GUI, the OS can display 1008 a set of autocomplete options to the user, including previously created tags. The display 1008 is responsive to the entry of one or more letters corresponding to the name of a previously created tag. In one embodiment, only tags that were previously created by the user are eligible to be shown as autocomplete options. In one embodiment, tags previously created on the data processing system that is currently in use by the user are displayed. In one embodiment, a set of tags which are not currently in use on the data processing system, but that are currently in use on a distributed storage system associated with the user's account are available as autocomplete options.

A user can select an entry from the autocomplete list displayed at 1008, or can enter the name of a new tag which was not displayed on the list. At 1010 the operating system can evaluate whether an entry from the autocomplete list is selected. If an autocomplete option is selected, the OS can attach 1012 the selected entry to the one or more files while providing via the GUI a visual indicator that a previously created tag has been attached to the file. In one embodiment, a confirmation dialogue can also be shown to the user to confirm the attachment of the previously created tag. If at 1010 it is determined that the user did not select an entry from the autocomplete list, and instead enters the name of a new tag, at 1014 the OS can receive via the GUI the name of the new tag to create. A new tag can be created with the received name, and the OS can provide a visual indication that the newly created tag has been attached to the file. In one embodiment, a confirmation dialogue can also be shown to the user to confirm the creation of a new tag. In one embodiment, an additional confirmation dialogue is displayed to confirm the attachment of the newly created tag. In one embodiment, attaching a tag to a file in operation 1012 and operation 1014 each include annotating metadata associated with the file by adding the existing or newly created tag to metadata associated with the file. The tag can be a word or set of words, and the word or set of words may already exist in the metadata or content of the file or it may not already exist in that metadata or content. In one embodiment, each tag can also be associated with a color indicator, to provide a visually distinctive element to the files associated with the tag. In one embodiment, a tag can be created or attached to a file contemporaneously with the file's creation by adding a tag to the file in the save dialog box of an application.

FIG. 11 is a flow diagram of tag Removal, according to an embodiment. If an association between a tag and a file is to be severed, an operation 1102 can be performed where the system receives an input indicating the selection of a visual representation of one or more files in a GUI. In operation 1104, the system can also receive an input indicating the intent to modify the set of tags associated with the one or more files. In one embodiment, the input can be a hotkey combination, or touch or multi-touch gesture. In one embodiment, the input can be via a click from a pointing device on a context menu displayed to the user via the GUI, or via a tag button on a GUI window. In operation 1106, the GUI can provide an interface through which one or more of tags associated with the one or more selected files can be removed.

In one embodiment, an operation 1108 can be performed, in which the system receives an input from the interface provided in operation 306, which indicates one or more tags that are to be removed, or otherwise de-associated from the one or more selected files selected via the visuals representation of the files in operation 1102. An additional operation 1110 can be performed once the set of files, and the set of tags have both been identified to the system. In operation 1110, the system can remove, or otherwise de-associate the one or more tags from the one or more files. In one embodiment, the de-association includes removing the tag, or a tag indicator, from metadata associated with the one or more files.

In one embodiment, the tagged management of stored items described herein can store tag information in metadata associated with the various tagged files. Various different software architectures can be used to implement the functions and operations described, including storing tag metadata along with other file system data associated with the tagged files, or storing all tag metadata in a specific database. The following discussion provides one example of such architecture, but it will be understood that alternative architectures may also be employed to achieve the same or similar results.

Tag Metadata Processing and Exchange

Figure 12:
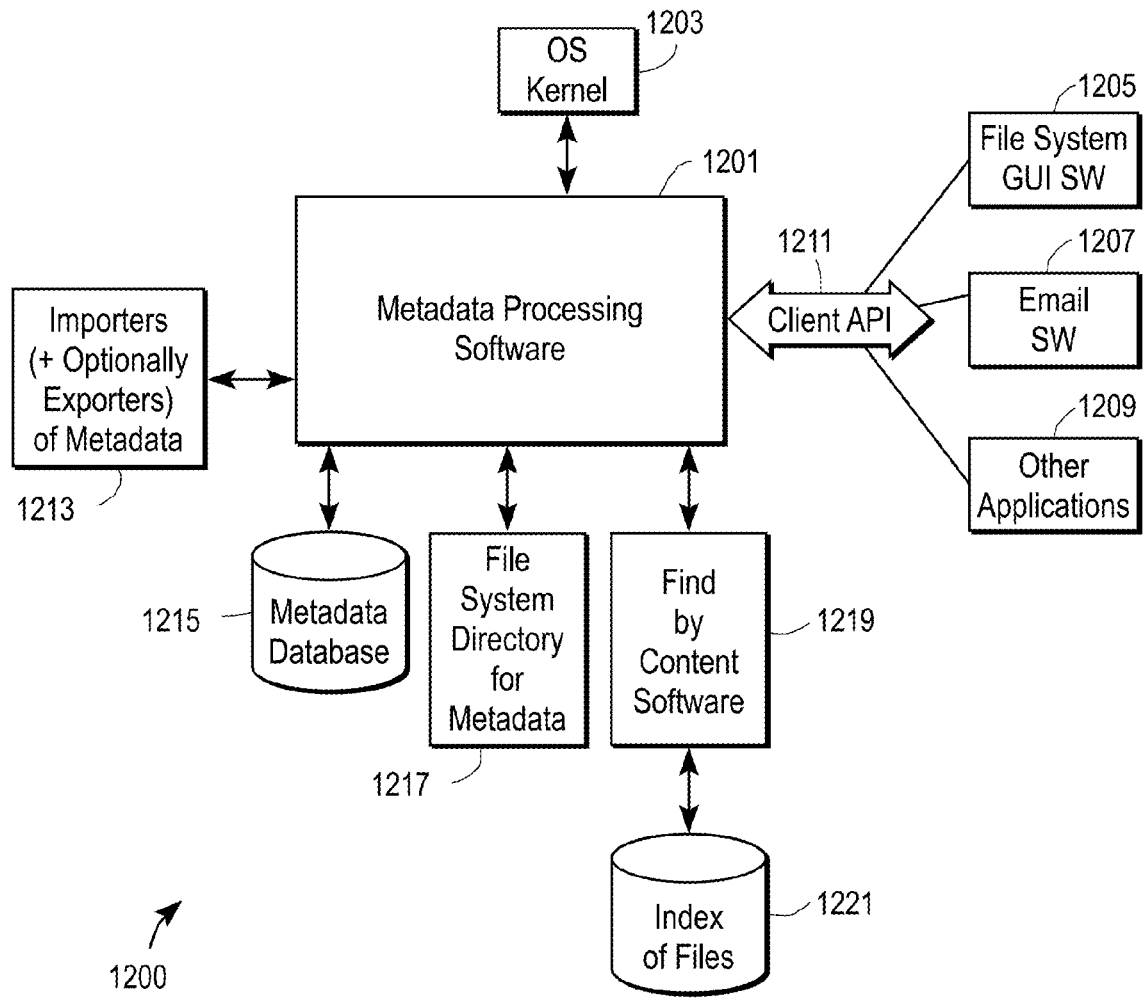
FIG. 12 is an exemplary architecture for file metadata management, including tag data management, according to an embodiment.

FIG. 12 is an exemplary architecture for file metadata management, including tag data management, according to an embodiment. The architecture 1200 includes metadata processing software 1201 and an operating system (OS) kernel 1203, which is operatively coupled to the metadata processing software 1201. The metadata processing software 1201 is also coupled to other software programs such as file system graphical user interface software 1205 (e.g., Finder), email software 1207, or other applications 1209. These applications are coupled to the metadata processing software 1201 through client application program interface (API) 1211, which provides a method for transferring data and commands between the metadata processing software 1201, and the software 1205, 1207, and 1209. These commands and data may include search parameters specified by a user as well as commands to perform searches from the user, which parameters and commands are passed to the metadata processing software 1201 through the interface 1211. In one embodiment, the application, removal and display of tags associated with the various files can use commands and data transferred through the client API 1211.

The metadata processing software 1201 is also coupled to a collection of importers 1213, which extract data from the various applications. The extracted data can then be placed in the metadata database 1215 for various purposes. For example, when a file is received electronically, metadata stored in the file attributes of the file, such as one or more tags associated with the incoming files can be extracted and added to the metadata database 1215. The importers of metadata 1213 can also be used to identify metadata, such as tag data, which is stored within a file and would be transmitted with the file if the file were to be transmitted electronically, for example, via Email software 1207. In one embodiment, software (e.g., the Email software 1207, File System GUI SW 1205, or Other Applications 1209) can be configured to use the client API 1211 to request the removal of tag data before, or during the electronic transmission of the file to a different data processing system.

The software architecture 1200 can also include a file system directory 1217 for the metadata. This file system directory keeps track of the relationship between the data files and their metadata (e.g., tag data) and keeps track of the location of the metadata object (e.g. a metadata file which corresponds to the data file from which it was extracted) created by each importer. The software architecture 1200 of FIG. 12 also includes find by content software 1219 that is operatively coupled to a database 1221 that includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 1219 searches for words in that content by searching through the database 1221 to see if a particular word exists in any of the data files which have been indexed. The find by content software functionality is available through the metadata processing software 1201 which provides the advantage to the user that the user can search concurrently both the index of files in the database 1221 (for the content within a file) as well as the metadata for the various data files being searched. In one embodiment, each file having one or more tag is automatically added to the index of files 1221, to allow searching by tag and by content.

In one embodiment, the metadata processing software 1201 facilitates the renaming of a tag from a first name to a second name, in which the name and file system of each file having the first tag is determined, and the tag applied to each file is changed from the old tag name to the new tag name. In one embodiment, each tag that is associated with a file has a specific identifier, which re-directs to a memory location, which stores information on a tag, including the name of the tag. To rename the tag, and to rename a tag, the name of the tag that is stored in the tag data can be changed, which can automatically update name of the tag applied to the various files. In one embodiment, when a tag is associated with a small number of files, the tag data can be stored with the file. In one embodiment, when a tag is associated with a large number of files, the data associated with the tag can be stored centrally, and a tag identifier can be stored with the file data, which references the centrally stored tag. In one embodiment, the centrally stored tag data can be copied with a file when the file is transferred electronically to a different data processing system, or to a different user.

Figure 13:
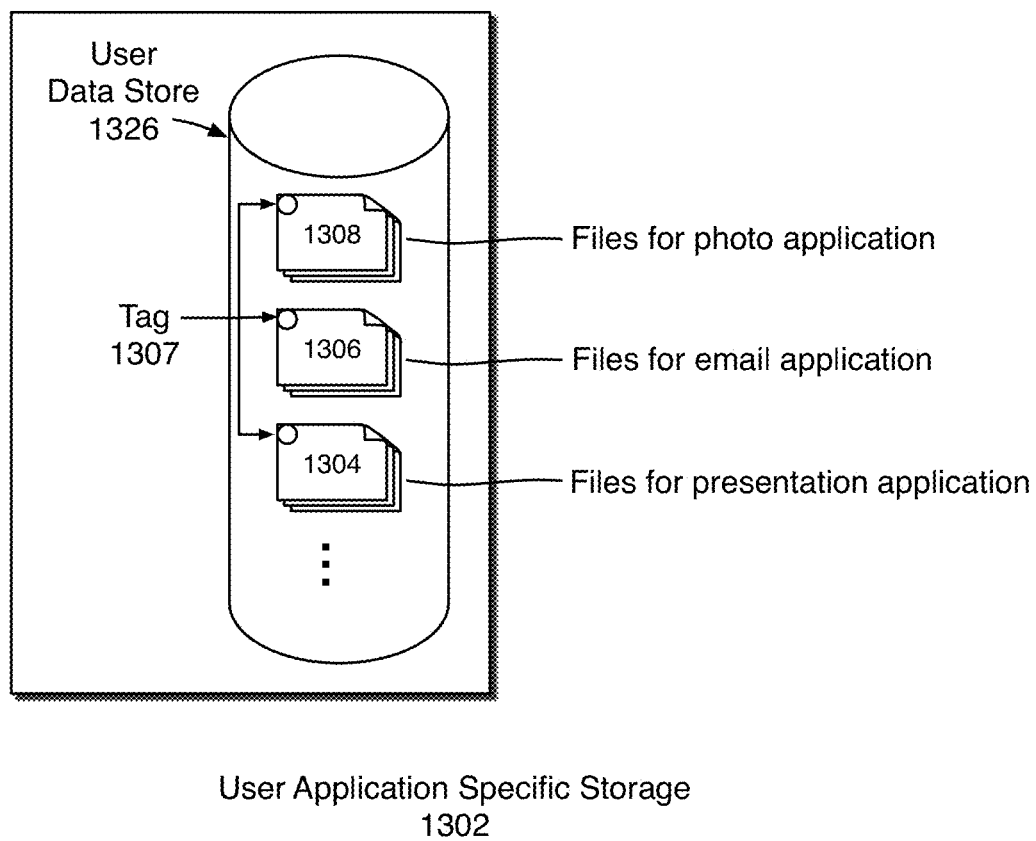
FIG. 13 is an illustration of an application specific file storage system storing tagged files from multiple applications, according to an embodiment.

FIG. 13 is an illustration of an application specific file storage system storing tagged files from multiple applications, according to an embodiment. In one embodiment, a system for application specific storage 1302 can include a user data store 1326, which can contain files for multiple applications using an application specific data store. A user interface for interacting with the application specific data store can be an embodiment of the user interface illustrated in FIGS. 5A-5C. Multiple applications, such as a photo application, an e-mail application, and a presentation application, can store files in the user data store 1326, and those files can be accessible from within each application. For example, files for a photo application 1308 can be created by a photo application and saved into a file store in the user data store 1326 that is specific to the photo application. Additionally, an e-mail application can save files for the e-mail application 1306 in a portion of the user data store 1326 that is specific to the e-mail application. Additionally, a presentation application can store files for the presentation application 1304 in a portion of the user data store 1326 that is specific to the presentation application.

In one embodiment, the user data store can be located on an exemplary cloud based distributed storage system, which can be accessible on a per-account basis. A user can store application specific files on the distributed storage system using a first data processing system, and access those files via an application on a second data processing system that has access to the application specific storage. In one embodiment, the cloud based distributed storage system can be used to synchronize tags between data processing systems of the same user. For example, a user at a first data processing system can create a tag, and the created tag can be synced between each data processing system upon which the user has an account on the distributed storage system.

Using the one or more tagging methods described herein, a user can create a tagged file group with files from multiple applications (which can each have their own, separate storage locations such as separate folders), such that files from multiple applications can be tagged with the same tag, and all of the files with the same tag can be viewed within a single window of a user interface. In one embodiment, applying the same tag to multiple files (such as different files having different file types) creates a relation between files that are stored in the various application specific data stores. A user interface can then be provided to allow each of the files can be viewed and accessed via in a user interface for displaying files having a particular tag.

In one embodiment, a file created by, or stored in the application specific data store of an application can be electronically transmitted to a different user or a different data processing system, and the file can be accessed by a compatible application. For example, files for the exemplary presentation application 1304 can be created and saved into the user data store 1326 in a portion that is specific to the presentation application, and then e-mailed, or otherwise electronically transmitted to a second user, or transferred and saved to a hierarchical file system of a data processing system in a user data store that is distinct from the application specific data store. In one embodiment, when files are transferred, the tags associated with the file are transferred as well. A filtering method can be employed when transferring files, or when displaying files with transferred tags, to limit the degree of tag proliferation that can occur on a user's system when receiving a large number of files, each with tags created by other users. For example, a filtering method can be used to prevent tags created by other users from appearing in the user's side bar portion until the user makes those tags active.

Figure 14:
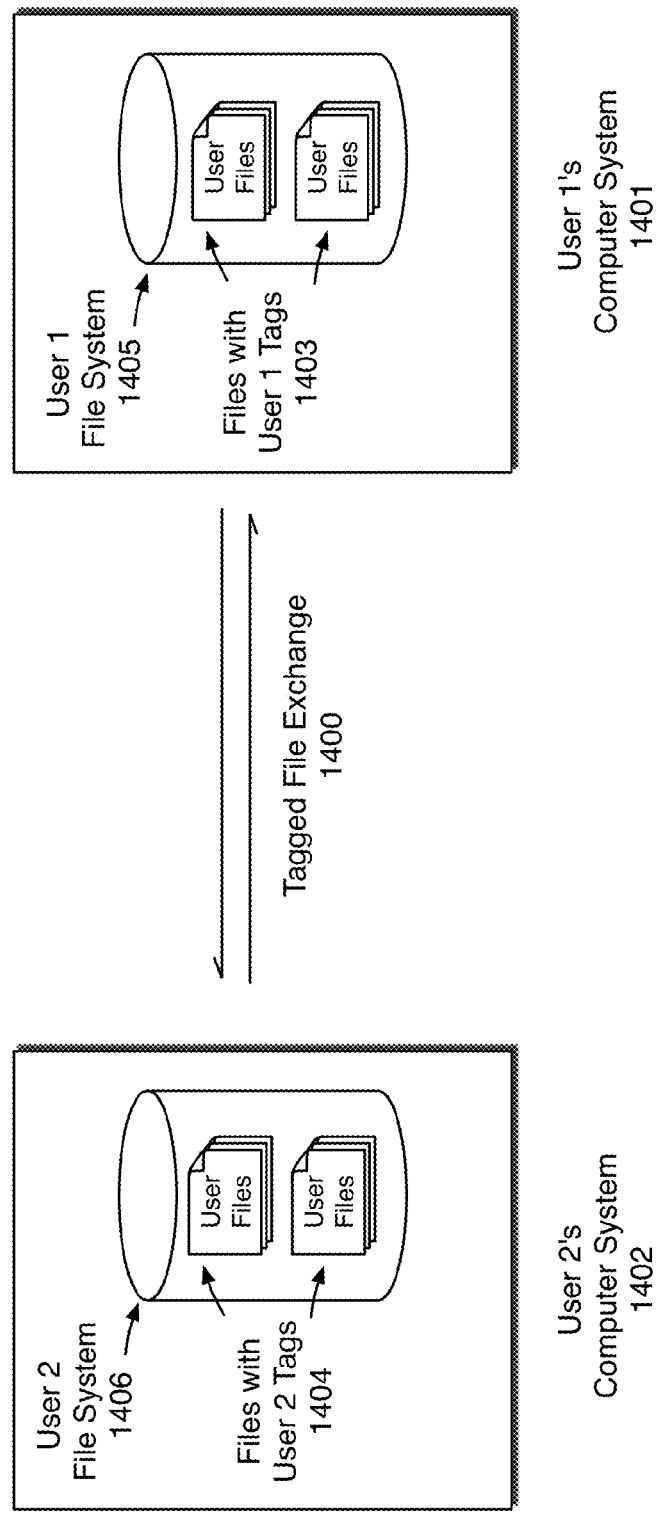
FIG. 14 is a block diagram of tagged file exchange between data processing systems, according to an embodiment.

FIG. 14 is a block diagram of tagged file exchange between data processing systems, according to an embodiment. A tagged file exchange 1400 between computer systems (e.g., user 1's computer system 1401, and user 2's computer system 1402) can occur in which files having tags of a first user (e.g., files with user 1 tags 1403) on a first computer system 1401 are exchanged with files having tags of a second user (e.g., files with user 2 tags 1404) at a second data processing system 1402. Each file stored on a file system of the first user 1405 can include metadata containing the one or more tags applied to the file. Likewise, each file on a file system of the second user 1406 can include metadata containing the one or more tags applied to the file.

In one embodiment, during tagged file exchange 1400, computer system software for performing electronic file transfer can utilize an API, such as the client API 1211 of FIG. 12, which provides a mechanism for transferring tag data and commands between the metadata processing software 1201, and the software that is performing the electronic file transfer between user 1's computer system 1401 and user 2's computer. Using the mechanism provided, metadata, including tag data, is transferred along with the file data during tagged file exchange. In one embodiment, software executing on a computer system of a user (e.g., user 1's computer system 1401 or user 2's computer system 1402) can be configured to use the client API 1211 to request the removal of tag data before, or during the electronic transmission of the file to a different data processing system. In one embodiment, a user can configure the computer system to automatically remove tags when transferring files to a different user.

In one embodiment, a computer system can be configured to remove tags from incoming files if a different user created the tags. In one embodiment, tags that are created by a different user that are not removed from a file either before, during, or after transmission can be queried, and the full list of tags applied by either user can be displayed, with a visual indication of which tags were applied by the first user, and which tags were applied by the second user. In one embodiment, a command, or user interface item to show all tags, (e.g., "Show All . . . " 207) can be configured to show all potential tags that may be applied to a file, including tags which are not currently applied to any file, including tags that were created by the second user, and arrived via an electronic file transport of the file from the second user.

In one embodiment, a computer system (e.g., user 1's computer system 1401, user 2's computer system 1402) can distinguish between tags created by the first user and tags created by the second user. Tags created by the first user can be automatically displayed in a tags list under a tags header in a side bar portion (e.g., tags header 108 in side bar portion 105 of FIG. 1) via a favorites or frequency of use mechanism. In one embodiment, a tag that is created by the second user, and transferred with a file to the data processing system of the first user is not eligible for automatic display until the first user applies the tag to a file of the second user.

Figure 15:
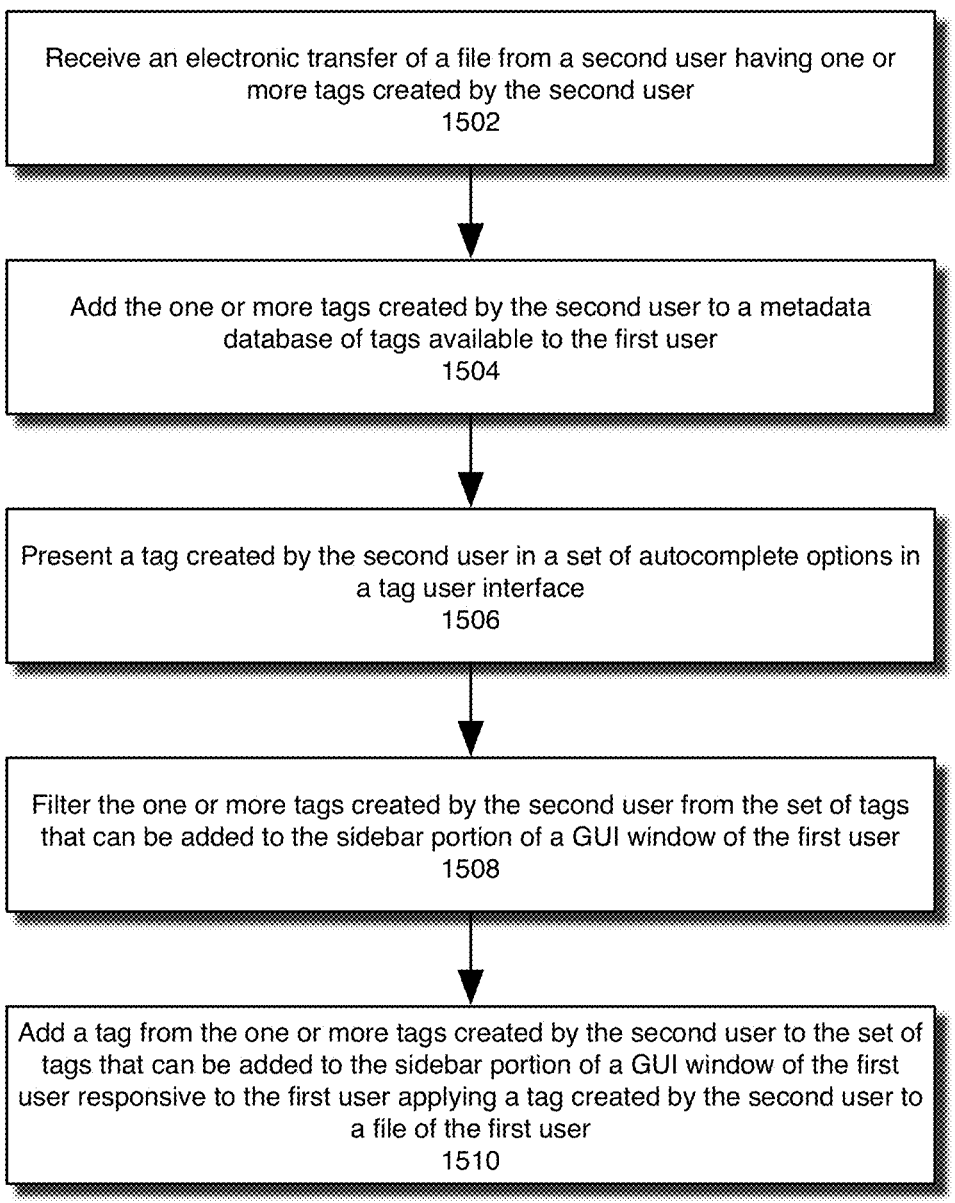
FIG. 15 is a flow diagram of a method of filtering the set of tags that can be automatically placed on the side bar portion of a user interface window, or otherwise become available as active tags, according to an embodiment.

FIG. 15 is a flow diagram of a method of filtering the set of tags that can be automatically placed on the side bar portion of a user interface window, or otherwise become available as active tags, according to an embodiment. In one embodiment, a first user can receive an electronic transfer of a file from a second user that contains a set of one or more tags that have been created by the second user, as shown at 1502. The computer system of the first user can perform an operation 1504 to add the one or more tags that have been created by the second user to the database of tags available to the first user. Subsequently, when a first user attempts to apply a tag to a file using the tag interface, the system can perform an operation 1506 to present a tag from the set of tags created by the second user in a set of autocomplete options (e.g., autocomplete options 708 of FIG. 7B) presented to the first user via the tag user interface.

While the tags in the set of tags added by the second user are presented as autocomplete options for the user to select when applying tags to a file, the system can perform an operation 1508 to filter the one or more tags created by the second user from the set of tags that can be added to the sidebar portion of a GUI window of the first user. However, an operation 1510 to add a tag from the one or more tags created by the second user to the set of tags that can be added to the side bar portion of the GUI window of the first user can be performed in response to the first user applying a tag created by the second user to a file of the first user. In other words, when the first user receives a file from the second user, and the second user has a tag applied to a file that was created by the second user, the tag can be partially available to the first user, such that the first user can apply the tag to the file of the first user, but the tag does not become fully active on the computer system of the first user at least until the first user applies the tag to a file of the first user.

In this respect, a second user can share tagged files with a first user, and the tags created by the second user that are associated with the shared files are available to be applied by the first user. However, in one embodiment, the tags created by the second user are not automatically activated on the system of the first user. Instead, the first user can selectively chose whether to apply one or more of the tags created by the second user to a file of the first user. Once applied, the tag can become active on the system of the first user, and the tag created by the second user will be become equivalent to a tag created by the first user (e.g. the tag created by the second user will appear in a list of tags that are active on the first user's system in a side bar portion of a GUI of the first user's system).

Exemplary Data Processing System

Figure 16:
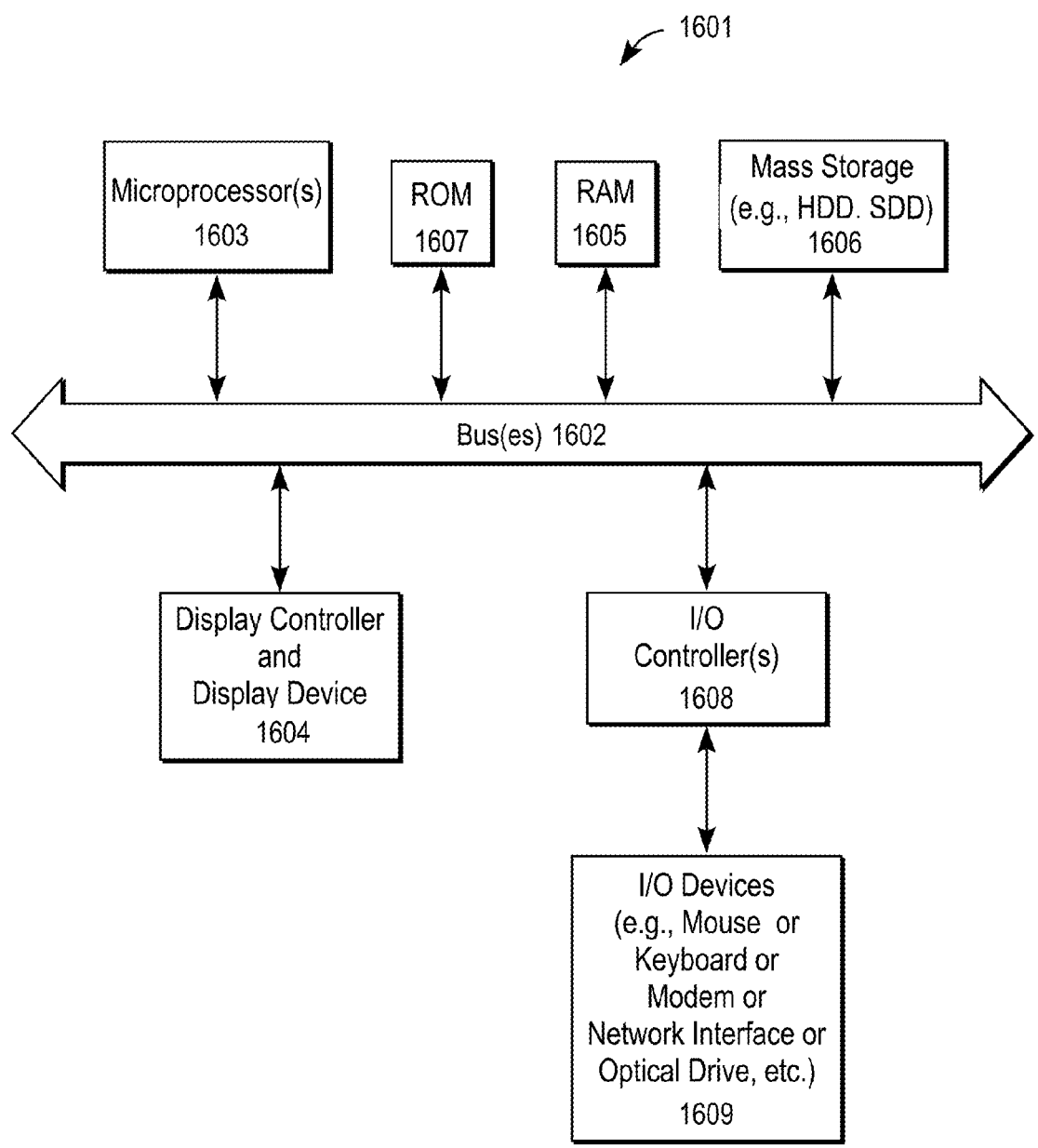
FIG. 16 is an illustration of the components of an exemplary computer system that can be used to implement the various embodiments.

FIG. 16 is an illustration of the components of an exemplary computer device that can be used to implement the various embodiments described herein. The computer system 1601 is a form of a data processing system, and includes a bus 1602 which is coupled to a processing unit with one or more microprocessor(s) 1603, a ROM (Read Only Memory) 1607 which can contain a firmware interface, such as the Unified Extensible Firmware interface (UEFI), and volatile RAM (Random Access Memory) 1605. The computer system 1601 can also include a non-volatile Mass Storage 1606, which can be a hard disk drive (HDD), solid-state disk (SDD), or some hybrid combination of an SSD and HDD. The bus 1602 interconnects the various components and also interconnects the components 1603, 1607, 1605, and 1606 to a display controller and display device 1604 and to peripheral devices such as input/output (I/O) devices which can be mice, keyboards, network interfaces, printers and other devices which are known in the art. Typically, the input/output devices 1609 are coupled to the system through input/output controllers 1608. Particularly, network interface input/output device 1609 can be used to allow the computer system 1601 to communicate with a distributed storage system over a data network.

The volatile RAM 1605 is typically implemented as dynamic RAM (DRAM), which continually refreshes data stored in memory to avoid data loss, and can lose data if system power is removed from the system. The mass storage 1606 is typically a magnetic hard drive or a magnetic optical drive or an optical drive or a DVD RAM or other types of memory systems, which maintain data (e.g. large amounts of data) even after power is removed from the system.

While FIG. 16 shows that the mass storage 1606 is a local device coupled directly to the rest of the components in the data processing system, it will be appreciated that the present invention can utilize non-volatile memory that is remote from the system, such as a network storage device which is coupled to the data processing system through a network interface such as a modem or Ethernet interface. The bus 1602 can include one or more buses connected to each other through various bridges, controllers and/or adapters as is well known in the art. In one embodiment the I/O controller 1608 includes one or more of a USB (Universal Serial Bus) adapter for controlling USB peripherals, an IEEE 1694 controller for IEEE 1694 compliant peripherals, or a Thunderbolt controller for controlling Thunderbolt peripherals.

It will be apparent from this description that aspects of the present invention may be embodied, at least in part, in software. That is, the techniques may be carried out in a computer system or other data processing system in response to its processor, such as a microprocessor, executing sequences of instructions contained in volatile or non-volatile memory, or a combination of such memories, which together may embody a non-transitory machine-readable storage medium. Non-transitory machine readable storage medium includes any type of machine readable storage medium, including floppy disks, flash memory devices, optical disks, or any type of media suitable for storing electronic instructions, such as ROM 1607, RAM 1605, mass storage 1606 or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software instructions to simplify description. However, those skilled in the art will recognize what is meant by such expressions is that the functions result from execution of the code by a processor, such as the microprocessor 1603.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method at a data processing system comprising:
    receiving, at the data processing system used by a first user, an electronic transfer of a first file from a second user having at least one tag created by the second user, wherein the at least one tag was manually assigned to the first file by the second user;
    adding the at least one tag created by the second user to a metadata database of tags available to the first user, while distinguishing the at least one tag created by the second user from tags created by the first user in the metadata database based on the identity of the second user;
    detecting a first input by the first user to modify one or more tags associated with a second file different from the first file;
    in response to detecting the first input by the first user, displaying a tag interface for modifying the one or more tags associated with the second file, wherein the tag interface includes the at least one tag created by the second user and one or more tags created by the user;
    detecting a second input by the first user selecting the at least one tag created by the second user from the tag interface to the second file; and
    in response to detecting the second input by the first user:
        associating the second file with the at least one tag created by the second user; and
        adding the at least one tag created by the second user to a sidebar portion of a graphical user interface (GUI) window.

2. The computer implemented method of claim 1, wherein the at least one tag created by the second user is presented in a set of autocomplete options in the tag user interface.

3. A non-transitory machine-readable medium storing instructions which, when executed by one or more processors on a data processing system, cause the data processing system to perform operations comprising:
    receiving, at the data processing system used by a first user, an electronic transfer of a first file from a second user having at least one tag created by the second user, wherein the at least one tag was manually assigned to the first file by the second user;
    adding the at least one tag created by the second user to a metadata database of tags available to the first user, while distinguishing the at least one tag created by the second user from tags created by the first user in the metadata database based on the identity of the second user;

detecting a first input by the first user to modify one or more tags associated with a second file different from the first file;

in response to detecting the first input by the first user, displaying a tag interface for modifying the one or more tags associated with the second file, wherein the tag interface includes the at least one tag created by the second user and one or more tags created by the user;

detecting a second input by the first user selecting the at least one tag created by the second user from the tag interface to the second file; and in response to detecting the second input by the first user:
associating the second file with the at least one tag created by the second user; and
adding the at least one tag created by the second user to a sidebar portion of a graphical user interface (GUI) window.

4. The non-transitory machine-readable medium of claim 3, wherein the at least one tag created by the second user is presented in a set of autocomplete options in the tag user interface.

5. The computer implemented method of claim 1, wherein the at least one tag created by the second user is not displayed within the sidebar portion of the GUI window prior to detecting the second input by the first user.

6. The computer implemented method of claim 1, further comprising, displaying the GUI window that includes the sidebar portion and a plurality of file representations associated with a plurality of files in a first region of the GUI window, wherein each of the plurality of file representations is associated with one or more tags, and wherein display of each of the plurality of file representations includes a corresponding file name.

7. The computer implemented method of claim 6, wherein displaying the GUI window further includes displaying a plurality of graphical representations of tags corresponding to a first file representation of the plurality of file representations in the first region of the GUI window proximate to the first file representation, wherein a first one of the plurality of graphical representations of tags corresponds to the at least one tag created by the second user.

8. The computer implemented method of claim 7, wherein a second one of the plurality of graphical representations of tags corresponds to a second tag different from the at least one tag created by the second user.

9. The computer implemented method of claim 7, wherein the plurality of graphical representations of tags corresponding to the first file includes a stack of icons, and wherein the stack of icons is indicative of a count of the tags associated with the first file.

10. The computer implemented method of claim 1, wherein the tag interface further includes one or more tags currently associated with the second file and a suggested list of one or more tags, wherein the tag interface enables the addition of one or more tags to the second file in a text-entry-based manner, and wherein each of the one or more tags currently associated with the second file and the suggested list of one or more tags in the tag interface is associated with a graphical representation and a text representation.

11. The computer implemented method of claim 10, wherein the at least one tag corresponds to one of the one or more tags in the tag interface, and the second input by the first user corresponds to selection of the at least one tag from among the one or more tags in the tag interface.

12. The computer implemented method of claim 1, wherein tag interface further includes one or more actions for performance on the second file, wherein the tag interface enables the addition of one or more tags to the second file in an icon-selection-based manner, and wherein each of the one or more tags in the tag interface is associated with a graphical representation.

13. The computer implemented method of claim 12, wherein the at least one tag corresponds to one of the one or more tags in the tag interface, and the second input by the first user corresponds to selection of the at least one tag from among the one or more tags in the tag interface.

14. The non-transitory machine-readable medium of claim 3, wherein the at least one tag created by the second user is not displayed within the sidebar portion of the GUI window prior to detecting the second input by the first user.

15. The non-transitory machine-readable medium of claim 3, wherein the instructions cause the data processing system to perform operations further comprising, displaying the GUI window that includes the sidebar portion and a plurality of file representations associated with a plurality of files in a first region of the GUI window, wherein each of the plurality of file representations is associated with one or more tags, and wherein display of each of the plurality of file representations includes a corresponding file name.

16. The non-transitory machine-readable medium of claim 15, wherein displaying the GUI window further includes displaying a plurality of graphical representations of tags corresponding to a first file representation of the plurality of file representations in the first region of the GUI window proximate to the first file representation, wherein a first one of the plurality of graphical representations of tags corresponds to the at least one tag created by the second user.

17. The non-transitory machine-readable medium of claim 16, wherein a second one of the plurality of graphical representations of tags corresponds to a second tag different from the at least one tag created by the second user.

18. The non-transitory machine-readable medium of claim 16, wherein the plurality of graphical representations of tags corresponding to the first file includes a stack of icons, and wherein the stack of icons is indicative of a count of the tags associated with the first file.

19. The non-transitory machine-readable medium of claim 3, wherein the tag interface further includes one or more tags currently associated with the second file and a suggested list of one or more tags, wherein the tag interface enables the addition of one or more tags to the second file in a text-entry-based manner, and wherein each of the one or more tags currently associated with the second file and the suggested list of one or more tags in the tag interface is associated with a graphical representation and a text representation.

20. The non-transitory machine-readable medium of claim 19, wherein the at least one tag corresponds to one of the one or more tags in the tag interface, and the second input by the first user corresponds to selection of the at least one tag from among the one or more tags in the tag interface.

21. The non-transitory machine-readable medium of claim 3, wherein tag interface further includes one or more actions for performance on the second file, wherein the tag interface enables the addition of one or more tags to the second file in an icon-selection-based manner, and wherein each of the one or more tags in the tag interface is associated with a graphical representation.

22. The non-transitory machine-readable medium of claim 21, wherein the at least one tag corresponds to one of the one or more tags in the tag interface, and the second input by the first user corresponds to selection of the at least one tag from among the one or more tags in the tag interface.

23. A device comprising:
a display;
one or more input devices;
a non-transitory machine readable storage medium storing instructions;
a network interface, to couple the device to a network; and
a processing unit having one or more microprocessors to execute the instructions, wherein execution of the instructions cause the processing unit to:
receive, at the device of a first user, an electronic transfer of a first file from a second user having at least one tag created by the second user, wherein the at least one tag was manually assigned to the first file by the second user;
add the at least one tag created by the second user to a metadata database of tags available to the first user, while distinguishing the at least one tag created by the second user from tags created by the first user in the metadata database based on the identity of the second user;
detect, via the one or more input devices, a first input by the first user to modify one or more tags associated with a second file different from the first file;
in response to detecting the first input by the first user, display, on the display, a tag interface for modifying the one or more tags associated with the second file, wherein the tag interface includes the at least one tag created by the second user and one or more tags created by the user;
detect, via the one or more input devices, a second input by the first user selecting the at least one tag created by the second user from the tag interface to the second file; and
in response to detecting the second input by the first user:
associate the second file with the at least one tag created by the second user; and
add the at least one tag created by the second user to a sidebar portion of a graphical user interface (GUI) window.

24. The device of claim 23, wherein the at least one tag created by the second user is presented in a set of autocomplete options in the tag user interface.

25. The device of claim 23, wherein the at least one tag created by the second user is not displayed within the sidebar portion of the GUI window prior to detecting the second input by the first user.

26. The device of claim 23, wherein the instructions further cause the processing unit to display, on the display, the GUI window that includes the sidebar portion and a plurality of file representations associated with a plurality of files in a first region of the GUI window, wherein each of the plurality of file representations is associated with one or more tags, and wherein display of each of the plurality of file representations includes a corresponding file name.

27. The device of claim 26, wherein displaying the GUI window further includes displaying a plurality of graphical representations of tags corresponding to a first file representation of the plurality of file representations in the first region of the GUI window proximate to the first file representation, wherein a first one of the plurality of graphical representations of tags corresponds to the at least one tag created by the second user.

28. The device of claim 27, wherein a second one of the plurality of graphical representations of tags corresponds to a second tag different from the at least one tag created by the second user.

29. The device of claim 27, wherein the plurality of graphical representations of tags corresponding to the first file includes a stack of icons, and wherein the stack of icons is indicative of a count of the tags associated with the first file.

30. The device of claim 23, wherein the tag interface further includes one or more tags currently associated with the second file and a suggested list of one or more tags, wherein the tag interface enables the addition of one or more tags to the second file in a text-entry-based manner, and wherein each of the one or more tags currently associated with the second file and the suggested list of one or more tags in the tag interface is associated with a graphical representation and a text representation.

31. The device of claim 30, wherein the at least one tag corresponds to one of the one or more tags in the tag interface, and the second input by the first user corresponds to selection of the at least one tag from among the one or more tags in the tag interface.

32. The device of claim 23, wherein tag interface further includes one or more actions for performance on the second file, wherein the tag interface enables the addition of one or more tags to the second file in an icon-selection-based manner, and wherein each of the one or more tags in the tag interface is associated with a graphical representation.

33. The device of claim 32, wherein the at least one tag corresponds to one of the one or more tags in the tag interface, and the second input by the first user corresponds to selection of the at least one tag from among the one or more tags in the tag interface.

* * * * *